United States Patent
Saito et al.

(10) Patent No.: US 9,541,012 B2
(45) Date of Patent: Jan. 10, 2017

(54) CONTROL APPARATUS OF INTERNAL COMBUSTION ENGINE

(71) Applicant: MITSUBISHI ELECTRIC CORPORATION, Chiyoda-ku, Tokyo (JP)

(72) Inventors: Toshikatsu Saito, Chiyoda-ku (JP); Michihisa Yokono, Hyogo (JP); Tomokazu Makino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 551 days.

(21) Appl. No.: 13/908,502

(22) Filed: Jun. 3, 2013

(65) Prior Publication Data

US 2014/0200791 A1    Jul. 17, 2014

(30) Foreign Application Priority Data

Jan. 11, 2013 (JP) ................. 2013-003166

(51) Int. Cl.
*F02D 23/00* (2006.01)
*F02D 13/02* (2006.01)
(Continued)

(52) U.S. Cl.
CPC ............... *F02D 23/00* (2013.01); *F02B 37/18* (2013.01); *F02D 13/0238* (2013.01);
(Continued)

(58) Field of Classification Search
CPC .... F02D 23/00; F02D 41/0007; F02D 41/145; F02D 13/0238; F02D 2200/0402; F02D 2200/0414; F02D 2200/0406; F02D 2200/0411; F02D 13/0269; F02D 9/02; F02D 41/1448; F02D 2250/34; Y02T 10/18; Y02T 10/142; Y02T 10/144; F02B 37/16; F02B 37/18; F02B 37/183; F02B 37/186; F02C 6/12
(Continued)

(56) References Cited

U.S. PATENT DOCUMENTS 6,250,292 B1 * 6/2001 Suhre ........................... 123/688
6,367,462 B1 * 4/2002 McKay et al. ........... 123/568.21
(Continued)

FOREIGN PATENT DOCUMENTS

JP   08-303293 A   11/1996
JP   2008-138630 A   6/2008

OTHER PUBLICATIONS

Communication dated Nov. 25, 2015 from the State Intellectual Property Office of the People's Republic of China in counterpart application No. 201310746206.4.

*Primary Examiner* — Joseph Dallo
(74) *Attorney, Agent, or Firm* — Sughrue Mion, PLLC; Richard C. Turner

(57) ABSTRACT

In a turbocharged internal combustion engine, an amount of cylinder suction air is calculated with sufficiently high accuracy to suitably control the internal combustion engine in consideration of influences of an exhaust pressure on a volumetric efficiency equivalent value without requiring a huge memory capacity, in fewer adaptive man hours, and under a low operation load. A correction calculation parameter is calculated using an exhaust pressure, an exhaust pressure for pre-correction volumetric efficiency equivalent value, and an intake manifold pressure, and a post-corrected volumetric efficiency equivalent value is calculated by correcting a pre-correction volumetric efficiency equivalent value using the correction calculation parameter. An amount
(Continued)

of air entering a cylinder from an intake manifold is calculated on the basis of the post-correction volumetric efficiency equivalent value.

18 Claims, 17 Drawing Sheets

(51) Int. Cl.
    *F02D 41/14*     (2006.01)
    *F02D 41/00*     (2006.01)
    *F02B 37/18*     (2006.01)

(52) U.S. Cl.
    CPC ....... *F02D 41/0007* (2013.01); *F02D 41/145* (2013.01); *F02D 13/0269* (2013.01); *F02D 2200/0402* (2013.01); *F02D 2200/0406* (2013.01); *F02D 2200/0411* (2013.01); *F02D 2200/0414* (2013.01); *Y02T 10/142* (2013.01); *Y02T 10/144* (2013.01); *Y02T 10/18* (2013.01)

(58) Field of Classification Search
    USPC ....... 60/600, 602, 605.1, 611; 123/465, 676, 123/681, 684, 568.11–568.28, 325, 399; 701/103–105, 108, 54
    See application file for complete search history.

(56) References Cited

U.S. PATENT DOCUMENTS

| | | | |
|---|---|---|---|
| 6,393,903 B1* | 5/2002 | Reed et al. | 73/114.01 |
| 6,636,796 B2* | 10/2003 | Kolmanovsky et al. | 701/104 |
| 6,820,600 B1* | 11/2004 | Sisken et al. | 123/568.21 |
| 6,837,227 B2* | 1/2005 | Jaliwala et al. | 123/568.21 |
| 7,085,647 B1* | 8/2006 | Prucka et al. | 701/114 |
| 7,117,078 B1* | 10/2006 | Gangopadhyay | 701/103 |
| 7,127,346 B1* | 10/2006 | Trombley et al. | 701/110 |
| 7,181,332 B1* | 2/2007 | Vick et al. | 701/103 |
| 7,536,249 B2* | 5/2009 | Muller | 701/102 |
| 7,865,291 B2* | 1/2011 | Muller | 701/103 |
| 8,532,910 B2* | 9/2013 | Wang et al. | 701/103 |
| 2002/0107630 A1* | 8/2002 | Yagi | 701/102 |
| 2007/0240679 A1* | 10/2007 | Tabata et al. | 123/348 |
| 2008/0077304 A1* | 3/2008 | Suzuki et al. | 701/102 |
| 2008/0098734 A1* | 5/2008 | Olsson | 60/605.1 |
| 2008/0127938 A1* | 6/2008 | Hagari | 123/439 |
| 2008/0167791 A1* | 7/2008 | Fulton et al. | 701/108 |
| 2008/0314132 A1* | 12/2008 | Nakano et al. | 73/114.32 |
| 2009/0018748 A1* | 1/2009 | Muller | 701/102 |
| 2009/0018753 A1* | 1/2009 | Muller | 701/103 |
| 2010/0206265 A1* | 8/2010 | Yamagata et al. | 123/337 |
| 2010/0242471 A1* | 9/2010 | Tomoda et al. | 60/602 |
| 2011/0036088 A1* | 2/2011 | Xin et al. | 60/605.1 |
| 2011/0054760 A1* | 3/2011 | Ogawa et al. | 701/102 |
| 2011/0139104 A1* | 6/2011 | Christian et al. | 123/90.17 |
| 2012/0291534 A1* | 11/2012 | Wang et al. | 73/114.52 |
| 2012/0296546 A1* | 11/2012 | Wang et al. | 701/101 |

* cited by examiner

| Pb÷Px<br>((Pb÷P3 OR Pb÷P30)) | BUFFER BF OR BF0 |
|---|---|
| 0.500 | 0.447 |
| 0.528 | 0.447 |
| 0.550 | 0.432 |
| 0.600 | 0.396 |
| 0.650 | 0.362 |
| 0.700 | 0.328 |
| 0.750 | 0.293 |
| 0.800 | 0.257 |
| 0.850 | 0.218 |
| 0.875 | 0.197 |
| 0.900 | 0.175 |
| 0.925 | 0.150 |
| 0.950 | 0.122 |
| 0.975 | 0.122 |
| 1.000 | 0.122 |

$$\sqrt{\left\{\left(\frac{P_b}{P_x}\right)^{\frac{1-k}{k}}-1\right\}} \quad \kappa=1.4 \text{ IN TABLE 901}$$

CONTROL APPARATUS OF INTERNAL COMBUSTION ENGINE

BACKGROUND OF THE INVENTION

Field of the Invention

The present invention relates to a control apparatus of an internal combustion engine, and more particularly, to a control apparatus of an internal combustion engine configured to calculate an amount of air sucked into cylinders with accuracy.

Description of the Related Art

In order to control an internal combustion engine suitably, it is crucial to perform fuel control and ignition control according to an amount of air sucked into cylinders by calculating the amount of air sucked into the cylinders with a high degree of accuracy. As a method of measuring an amount of air sucked into the cylinders of the internal combustion engine, a pressure sensor (hereinafter, referred to as the intake manifold pressure sensor) is provided to measure a pressure in a portion including a surge tank and an intake manifold (hereinafter, collectively referred to as the intake manifold) located downstream of a throttle valve, and an amount of air sucked into the cylinders is calculated on the basis of an intake manifold pressure measured by the intake manifold pressure sensor and a rotational speed of the internal combustion engine (hereinafter, referred to as the engine speed) (this method is known as the Speed Density method and hereinafter referred to as the S/D method). Because the intake manifold pressure sensor is relatively inexpensive, the S/D method is employed extensively.

An example of the S/D method is disclosed, for example, in JP-A-08-303293 (Patent Document 1). Patent Document 1 discloses that an amount of cylinder suction air is calculated on the basis of an intake manifold pressure, a volumetric efficiency equivalent value (referred to as the volumetric efficiency VE in Patent Document 1), which is an index of an amount of air sucked from the intake manifold into the cylinders, a cylinder volume V, and a temperature T. The volumetric efficiency VE is stored in a single map with axes representing the intake manifold pressure and the engine speed.

In order to achieve further lower fuel consumption and a higher output, an engine that is becoming popular in recent years is equipped with a VVT (Variable Valve Timing) mechanism (hereinafter, referred to as the intake VVT) that allows opening and closing timing of an intake valve to vary. In the engine equipped with the intake VVT, an amount of an exhaust gas flown back from an exhaust path to the cylinders and an actual compression ratio vary with a difference of the valve opening and closing timing. Accordingly, even under the same conditions of the intake manifold pressure and the engine speed, an amount of cylinder suction air varies considerably depending on a difference of the valve opening and closing timing. Hence, unless influences of the valve opening and closing timing on the volumetric efficiency VE are taken into consideration, a degree of calculation accuracy of an amount of cylinder suction air is lowered over the entire steady and transient operating ranges in the S/D method disclosed in Patent Document 1.

To overcome the problem as above, there is a method taking an engine equipped with the intake VVT into consideration as is described, for example, in JP-A-2008-138630 (Patent Document 2). Patent Document 2 discloses a method (AFS method) by which an amount of air is measured by an AFS (Air Flow Sensor) provided upstream of a throttle valve of an intake pipe of the engine. An intake system is modeled according to the mass conservation law alone and an amount of cylinder suction air is calculated using a volumetric efficiency correction coefficient. The technique described in Patent Document 1 and the technique described in Patent Document 2 consider so-called a state equation of ideal gas ($P=\rho RT$, where P is a pressure, $\rho$ is a density, R is a gas constant, and T is a temperature). It can be assumed that a volumetric efficiency correction coefficient in Patent Document 2 and the volumetric efficiency VE in Patent Document 1 are equivalent (hereinafter, these terms as well as the one used herein are referred to as the volumetric efficiency equivalent value $K_v$). In the engine unequipped with the intake VVT, the volumetric efficiency equivalent value $K_v$ is stored in a single map with axes representing the intake manifold pressure and the engine speed as is in Patent Document 1.

In the method disclosed in Patent Document 2, one volumetric efficiency equivalent value $K_v$ map is held for every operating condition of an intake VVT phase angle. For example, in a case where an operating range of the intake VVT phase angle is indicated by six representative points and intervals are interpolated, six volumetric efficiency equivalent value $K_v$ maps are held. When configured in this manner, it becomes possible to calculate an amount of cylinder suction air in consideration of influences of the valve opening and closing timing on the volumetric efficiency equivalent value $K_v$.

In the method of Patent Document 1, it is also possible to calculate an amount of cylinder suction air in consideration of influences of the valve opening and closing timing on the volumetric efficiency equivalent value $K_v$ by holding the volumetric efficiency equivalent value $K_v$ map for every operating condition of the intake VVT phase angle.

Patent Document 1: JP-A-08-303293
Patent Document 2: JP-A-2008-138630

Incidentally, there is a turbocharger having a supercharger that is installed in an intake path of the engine and driven by rotating a turbine with an exhaust gas. The turbocharger generally has an exhaust bypass passage located upstream of the turbine. The turbocharger regulates an amount of an exhaust gas flown into the turbine by diverting a part of the exhaust gas flown through an exhaust path into the bypass passage using a waste gate valve (hereinafter, referred to as the W/G valve) provided to the exhaust bypass passage, and controls a supercharging pressure to be maintained at an adequate level.

More specifically, in a case where an opening degree of the W/G valve is controlled to be on an opening side, an amount of the exhaust gas flown into the turbine is decreased and a supercharging pressure drops, whereas in a case where an opening degree of the W/G valve is controlled to be on a closing side, an amount of the exhaust gas flown into the turbine is increased and a supercharging pressure rises. In this instance, a pressure in the exhaust path located upstream of the turbine (hereinafter, referred to as the exhaust pressure) varies, too. Hence, in a case where an opening degree of the W/G valve is controlled to be on the opening side, the exhaust pressure drops whereas the exhaust pressure rises in a case where an opening degree of the W/G valve is controlled to be on the closing side.

Under the same conditions of the intake manifold pressure, the engine speed, and the valve opening and closing timing, an amount of the exhaust gas flown back from the exhaust path to the cylinders increases when the exhaust pressure is high, whereas an amount of the exhaust gas flown back from the exhaust path to the cylinders degreases when the exhaust pressure is low. In other words, in the turbocharged engine in which the exhaust pressure varies considerably with an opening degree of the W/G valve even under the same conditions of the intake manifold pressure, the engine speed, and the valve opening and closing timing, a degree of calculation accuracy of an amount of cylinder suction air becomes poor unless consideration is given to influences of the exhaust pressure on the volumetric efficiency equivalent value $K_v$.

Hereinafter, influences of the exhaust pressure on the volumetric efficiency equivalent value $K_v$ will be described in detail. A relation of an amount of cylinder suction air and the volumetric efficiency equivalent value $K_v$ is expressed by Equation (1) as follows:

[Mathematical Formula 1]

$$Q = K_v \times P_b \times V_c \div (T_b \times R \times T\_SGT) \quad (1)$$

where Q is an amount of cylinder suction air [g/s], $K_v$ is the volumetric efficiency equivalent value, $P_b$ is an intake manifold pressure [kPa], $V_c$ is a cylinder displacement [L], $T_b$ is an intake manifold temperature [K], R is a gas constant [J/(kg·K)], and T_SGT is a predetermined crank angle interval [sec] (in the case of a four-cylinder engine, the interval is 180 degrees and in the case of a three-cylinder engine, the interval is 240 degrees).

Equation (1) above is the same as the one used in Patent Document 1. In accordance with Equation (1), the volumetric efficiency equivalent value $K_v$ can be calculated using an amount of cylinder suction air, Q (g/s), an intake manifold pressure $P_b$ (kPa), a cylinder displacement $V_c$ (L), an intake manifold temperature $T_b$ (K), a gas constant R (J/kg·K), and a predetermined crank angle interval T_SGT (sec). The volumetric efficiency equivalent value $K_v$ in each operating range of an engine of interest is obtained by a simulation in actual use. By storing the obtained volumetric efficiency equivalent values $K_v$ in the volumetric efficiency equivalent value $K_v$ map with axes representing an intake manifold pressure and an engine speed, a volumetric efficiency equivalent value $K_v$ is calculated during the actual engine control using an intake manifold pressure, an engine speed, and the volumetric efficiency equivalent value $K_v$ map.

Images I through III of FIG. 14 are image views showing relations of an exhaust pressure, an internal EGR ratio {=partial pressure of burned gas in cylinders when the intake value is closed÷(partial pressure of burned gas in cylinders when the intake value is closed+partial pressure of air in cylinders when the intake valve is closed)}, and an amount of cylinder suction air with respect to an intake manifold pressure at the same engine speed. In each image view, a solid line indicates a relation when the W/G valve is fully closed (on the supercharging side) and an alternate long and short dash line indicates a relation when the W/G valve is fully opened (on the relief side). It should be noted that the valve opening and closing timing of the intake valve is the same when the W/G valve is fully closed and fully opened.

A relation of an exhaust pressure with respect to an intake manifold pressure will be described using Image I of FIG. 14. In Image I, the abscissa is used for the intake manifold pressure and the ordinate is used for the exhaust pressure.

In a region where the intake manifold pressure is lower than the one on a vertical broken line A, the exhaust pressure is substantially equal when the W/G valve is fully opened and fully closed. The reason underlying this result is that an amount of an exhaust gas flown into the turbine is too small for the turbine to rotate high enough for supercharging (the exhaust pressure does not rise, either) regardless of whether the W/G valve is fully opened or fully closed. In a region where the intake manifold pressure is in a range from the one on the vertical line A to the one on a vertical line B, an amount of an exhaust gas flown into the turbine is large and the turbine rotates high enough for supercharging when the W/G value is fully closed. At the same time, because resistance when the exhaust gas passes through the turbine increases, the exhaust pressure rises above atmospheric pressure. On the other hand, when the W/G valve is fully opened, because most of the exhaust gas passes through the exhaust bypass passage side, the exhaust pressure exceeds atmospheric pressure only slightly. In a region where the intake manifold pressure is higher than the one on the vertical broken line B, a flow rate of the exhaust gas is so high that an exhaust gas cannot be released sufficiently toward the exhaust bypass passage even when the W/G valve is fully opened. Hence, because an amount of the exhaust gas flown into the turbine increases, the exhaust pressure rises above atmospheric pressure.

A relation of the internal EGR ratio with respect to an intake manifold pressure will now be described using Image II of FIG. 14. In Image II, the abscissa is used for the intake manifold pressure and the ordinate is used for the internal EGR ratio.

In a region where the intake manifold pressure is lower than the one on the vertical broken line A, the internal EGR ratio with respect to the same intake manifold pressure is substantially equal when the W/G valve is fully opened and fully closed. The reason underlying this result is that because the exhaust pressure is substantially equal when the W/G valve is fully opened and fully closed (see Image I), an amount of the exhaust gas flown back from the exhaust path to the cylinders is also substantially equal when the W/G valve is fully opened and fully closed. In a region where the intake manifold pressure is in a range from the one on the broken line A to the one on the broken line B, the internal EGR ratio with respect to the same intake manifold pressure is lower when the W/G valve is fully opened than when the W/G valve is fully closed. The reason underlying this result is that because the exhaust pressure with respect to the same intake manifold pressure is lower when the W/G valve is fully opened than when the W/G valve is fully closed (see Image I), an amount of the exhaust gas flown back from the exhaust path to the cylinders decreases when the W/G valve is fully opened in comparison with an amount of the flown back exhaust gas when the W/G valve is fully closed. In a region where the intake manifold pressure is higher the one on the vertical broken line B, a difference between the internal EGR ratios with respect to the same intake manifold pressure when the W/G valve is fully opened and fully closed becomes smaller as the intake manifold pressure rises. The reason underlying this result is that because an amount of cylinder suction air increases as the intake manifold pressure rises, a space in the cylinders for the exhaust gas flown back from the exhaust path to the cylinders becomes smaller, and therefore a difference between amounts of the exhaust gas flown back from the exhaust path to the cylinders with respect to the same intake manifold pressure becomes smaller even when there is a difference between the exhaust pressures when the W/G valve is fully opened and fully closed (see Image I).

A relation of an amount of cylinder suction air with respect to an intake manifold pressure will now be described using image III of FIG. 14. In Image III, the abscissa is used for the intake manifold pressure and the ordinate is used for an amount of cylinder suction air, Q.

In a region where the intake manifold pressure is lower than the one on the vertical broken line A, because the internal EGR ratio with respect to the same intake manifold pressure is substantially equal when the W/G valve is fully opened and fully closed (see Image II), an amount of cylinder suction air, Q, with respect to the same intake manifold pressure is substantially equal when the W/G valve is fully opened and fully closed. In a region where the intake manifold pressure is in a range from the one on the vertical broken line A to the one on the vertical broken line B, the internal EGR ratio with respect to the same intake manifold pressure is lower when the W/G valve is fully opened than when the W/G valve is fully closed (see Image II). Hence, an amount of cylinder suction air, Q, with respect to the same intake manifold pressure increases when the W/G valve is fully opened in comparison with an amount of cylinder suction air, Q, when the W/G valve is fully closed. In a region where the intake manifold pressure is higher than the one on the vertical broken line B, a difference between the internal EGR ratios with respect to the same intake manifold pressure when the W/G valve is fully opened and fully closed becomes smaller as the intake manifold pressure rises. Hence, a difference between amounts of cylinder suction air, Q, with respect to the same intake manifold pressure when the W/G valve is fully opened and fully closed becomes smaller.

As has been described, even under the same conditions of an intake manifold pressure and an engine speed, an amount of cylinder suction air varies considerably depending on a difference of the exhaust pressure. In a case where no consideration is given to influences of the exhaust pressure on the volumetric efficiency equivalent value $K_v$ calculated during the actual engine control using an intake manifold pressure, an engine speed, and the volumetric efficiency equivalent value $K_v$ map, there arises a problem that a degree of calculation accuracy of an amount of cylinder suction air becomes lower. For example, assume a case where the volumetric efficiency equivalent value $K_v$ when the W/G valve is fully closed is calculated in accordance with Equation (1) above and pre-stored in a map with axes representing an intake manifold pressure and an engine speed for use during actual engine control. When the W/G valve is controlled to be fully closed, an amount of cylinder suction air, Q, calculated in an engine control computer unit (hereinafter, referred to as the ECU) is calculated with accuracy for an actual amount of air. There is, however, a case where an amount of cylinder suction air, Q, calculated in the ECU is smaller than the actual amount of air when the W/G valve is controlled to be on the opening side and the exhaust pressure drops from the one when the W/G valve is fully closed at the same intake manifold pressure and engine speed.

Regarding the problem above, consideration of influences of the exhaust pressure on the volumetric efficiency equivalent value $K_v$ is described in neither Patent Document 1 nor Patent Document 2.

In addition, as in the case where consideration is given to influences of the valve opening and closing timing on the volumetric efficiency equivalent value $K_v$, the volumetric efficiency equivalent value $K_v$ map may be held for every operating condition of the W/G valve. In a case where an operating range of the W/G valve is indicated by six representative points and intervals are interpolated, six volumetric efficiency equivalent value $K_v$ maps are held. It is possible to consider influences of the exhaust pressure on the volumetric efficiency equivalent value $K_v$ by this method. However, in an engine equipped with the intake VVT and the turbocharger, six volumetric efficiency equivalent value $K_v$ maps for consideration of the valve opening and closing timing are held for each of the six representative points of the operating range of the W/G valve. In short, 6×6, that is, 36 volumetric efficiency equivalent value $K_v$ maps are necessary. Hence, there are problems that a large number of man hours are required for adaptation and data setting and that a microcomputer in the ECU requires a huge memory capacity.

In a case where an opening degree of the W/G valve is controlled in such a manner that the W/G valve opens at a unique opening degree with respect to an intake manifold pressure and an engine speed, the exhaust pressure also takes a unique value with respect to an intake manifold pressure and an engine speed. Hence, no consideration is necessary for a difference of the exhaust pressures at the same intake manifold pressure and engine speed. In this case, however, there is a problem that it becomes impossible to control the W/G valve at an arbitrary opening degree (for example, acceleration cannot be achieved by raising a supercharging pressure by controlling the W/G valve to be on the closing side temporarily in response to an acceleration request from the driver).

SUMMARY OF THE INVENTION

The invention was devised to solve the problems discussed above and has an object to provide a control apparatus of an internal combustion engine capable of calculating an amount of cylinder suction air with accuracy sufficiently high to suitably control a turbocharged internal combustion engine in consideration of influences of an exhaust pressure on a volumetric efficiency equivalent value, without requiring a huge memory capacity, in fewer adaptation man hours, and under a low operational load.

A control apparatus of an internal combustion engine of the invention is a control apparatus of an internal combustion engine controlling an internal combustion engine equipped with a supercharger having a turbine provided to an exhaust path of the internal combustion engine and a compressor provided upstream of a throttle valve provided to an intake path of the internal combustion engine and rotating integrally with the turbine. The control apparatus includes: an intake manifold pressure detection portion that detects an internal pressure of an intake manifold formed of a portion including a surge tank and an intake manifold provided downstream of the throttle valve as an intake manifold pressure; an intake manifold temperature detection portion that detects an internal intake temperature of the intake manifold as an intake manifold temperature; a waste gate valve that is provided to a bypass passage bypassing the turbine and changes a passage sectional area of the bypass passage by changing an opening degree; a rotation speed detection portion that detects a rotation speed of the internal combustion engine; an exhaust pressure calculation portion that calculates a pressure in the exhaust path provided upstream of the turbine as an exhaust pressure; a pre-correction volumetric efficiency equivalent value calculation portion that calculates a pre-correction volumetric efficiency equivalent value, which is an index indicating an amount of air entering a cylinder of the internal combustion engine from the intake manifold at one of a predetermined opening degree and a predetermined opening degree indicated value of the waste gate valve, on the basis of the intake manifold pressure and the rotation speed of the internal combustion engine; and an exhaust pressure calculation portion for pre-correction volumetric efficiency equivalent value that calculates an exhaust pressure for pre-correction volumetric efficiency equivalent value, which is an exhaust pressure corresponding to the pre-correction volumetric efficiency equivalent value, on the basis of the intake manifold pressure and the rotation speed of the internal combustion engine. A correction calculation parameter is calculated using the exhaust pressure, the exhaust pressure for pre-correction volumetric efficiency equivalent value, and the intake manifold pressure, and a post-correction volumetric efficiency equivalent value is calculated by correcting the pre-correction volumetric efficiency equivalent value using the correction calculation parameter. The amount of air entering the cylinder from the intake manifold is calculated on the basis of the post-correction volumetric efficiency equivalent value.

According to the control apparatus of an internal combustion engine of the invention, the pre-correction volumetric efficiency equivalent value is calculated on the basis of the intake manifold pressure and the rotation speed of the internal combustion engine, and the correction calculation parameter is calculated using the exhaust pressure, the exhaust pressure corresponding to the pre-correction volumetric efficiency equivalent value, and the intake manifold pressure. By correcting the pre-correction volumetric efficiency equivalent value using the correction calculation parameter, it becomes possible to calculate an amount of cylinder suction air with accuracy according to an operating condition independently of a variance of the exhaust pressure even in a supercharged internal combustion engine.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Hereinafter, a preferred embodiment of a control apparatus of an internal combustion engine of the invention will be described with reference to the drawings.

First Embodiment

Figure 15:
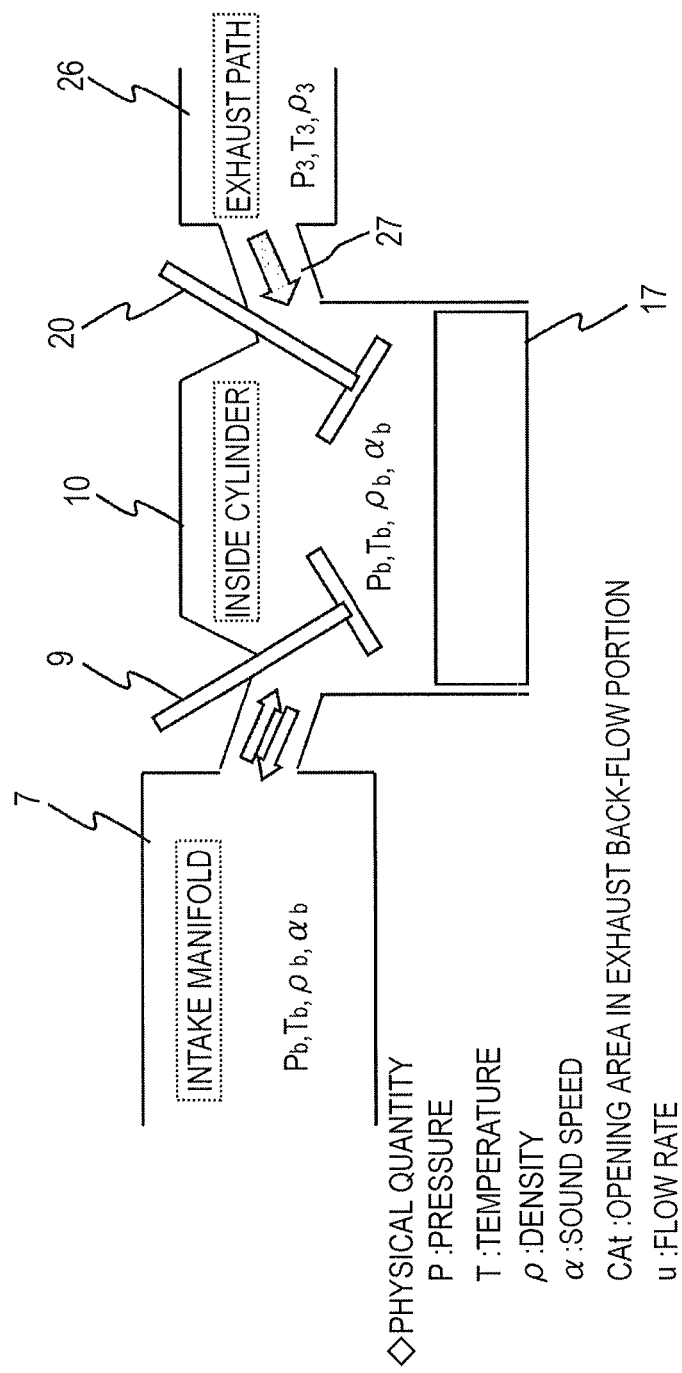
FIG. 15 is a model view showing a state in which an exhaust gas is flown back from an exhaust path to a cylinder.

Firstly, in order to describe a first embodiment of the invention, a variance of an amount of an exhaust gas flown back from an exhaust path to a cylinder in response to a variance of an exhaust pressure will be described using FIG. 15. FIG. 15 is a model view of a state in which an exhaust gas is flown back from the exhaust path to the cylinder. Numeral 7 denotes an intake manifold, numeral 9 denotes an intake valve, numeral 10 denotes a cylinder, numeral 17 denotes a piston, numeral 20 denotes an exhaust valve, numeral 26 denotes an exhaust path (located upstream of a turbine), and numeral 27 denotes a back-flow portion from the exhaust path 26. Assume that both of the intake valve 9 and the exhaust valve 20 are opened and gases in the intake manifold 7 and the cylinder 10 are in an equilibrium condition (pressure and temperature are equal). Firstly, Equation (2) below is obtained from a relational expression of isentropic change and a relational expression of sound speed.

[Mathematical Formula 2]

$$\frac{P}{\rho} = const, \alpha = \sqrt{\kappa RT} = \sqrt{\kappa \frac{P}{\rho}} \quad (\theta P = \rho RT) \tag{2}$$

where P is a pressure, $\rho$ is a density, $\alpha$ is a sound speed, $\kappa$ is a specific heat ratio, R is a gas constant, and T is a temperature.

Also, the energy conservation law at the back-flow portion 27 from the exhaust path 26 is expressed by Equation (3) as follows:

[Mathematical Formula 3]

$$\frac{1}{2} \cdot u_b^2 + \frac{\kappa}{\kappa-1} \cdot \frac{P_b}{\rho_b} = \frac{\kappa}{\kappa-1} \cdot \frac{P_3}{\rho_3} \tag{3}$$

where $P_b$ is an intake manifold pressure, $\rho_b$ is a density in the intake manifold, $u_b$ is a flow velocity at the back-flow portion from the exhaust path, $P_3$ is an exhaust pressure, and $\rho_3$ is a density in the exhaust path.

The flow velocity $u_b$ at the back-flow portion 27 from the exhaust path 26 is expressed by Equation (4) below using Equation (2) above and Equation (3) above.

[Mathematical Formula 4]

$$u_b = \sqrt{\frac{2\kappa}{\kappa-1}\left(\frac{P_3}{\rho_3} - \frac{P_b}{\rho_b}\right)} = \tag{4}$$

$$\alpha_b \sqrt{\frac{2}{\kappa-1}\left(\frac{P_3}{\rho_3}\frac{\rho_b}{P_b} - 1\right)} = \alpha_b \sqrt{\frac{2}{\kappa-1}\left[\left(\frac{P_b}{P_3}\right)^{\frac{1-\kappa}{\kappa}} - 1\right]}$$

where $\alpha_b$ is a sound speed at the back-flow portion from the exhaust path.

Let $CA_t$ be an equivalent value to an effective opening area of the back-flow portion 27 from the exhaust path 26. A mass flow rate $m_b$ at the back-flow portion 27 from the exhaust path 26 is found in accordance with Equation (4) above using $CA_t$, which is expressed by Equation (5) as follows:

[Mathematical Formula 5]

$$m_b = \rho_b \cdot u_b \cdot CA_t = \rho_b \cdot \alpha_b \cdot CA_t \sqrt{\frac{2}{\kappa-1}\left[\left(\frac{P_b}{P_3}\right)^{\frac{1-\kappa}{\kappa}} - 1\right]}. \tag{5}$$

By modifying Equation (5) above using Equation (2) above and a state equation of gas, Equation (6) below is obtained.

[Mathematical Formula 6]

$$m_b = \frac{P_b}{RT_b} \cdot \sqrt{\kappa RT_b} \cdot CA_t \sqrt{\frac{2}{\kappa-1}\left[\left(\frac{P_b}{P_3}\right)^{\frac{1-\kappa}{\kappa}} - 1\right]} = \tag{6}$$

$$\frac{P_b}{\sqrt{T_b}} \cdot \sqrt{\frac{\kappa}{R}} \cdot CA_t \sqrt{\frac{2}{\kappa-1}\left[\left(\frac{P_b}{P_3}\right)^{\frac{1-\kappa}{\kappa}} - 1\right]}$$

where $T_b$ is an intake manifold temperature.

In accordance with Equation (6) above, a variance of an amount of an exhaust gas flown back from the exhaust path 26 to the cylinder 10 in response to a variance of the exhaust pressure is found in the following manner.

Let $P_{30}$ be an exhaust pressure (exhaust pressure for pre-correction volumetric efficiency equivalent value) obtained also when pre-correction volumetric efficiency equivalent values $K_{v0}$ in the respective operating ranges of the engine of interest are obtained by a simulation in actual use, and $T_{b0}$ be an intake manifold temperature. A variance of an amount of an exhaust gas flown back from the exhaust path 26 to the cylinder 10 at the same intake manifold pressure and engine speed is expressed by a ratio $\eta'$ to an amount of the exhaust gas, $m_{b0}$, flown back to the cylinder 10 at the pre-correction volumetric efficiency equivalent value $K_{v0}$, which is expressed by Equation (7) as follows:

[Mathematical Formula 7]

$$\eta' = \frac{m_b}{m_{b0}} = \frac{\frac{P_b}{\sqrt{T_b}} \cdot \sqrt{\frac{\kappa}{R}} \cdot CA_t \sqrt{\frac{2}{\kappa-1}\left[\left(\frac{P_b}{P_3}\right)^{\frac{1-\kappa}{\kappa}} - 1\right]}}{\frac{P_b}{\sqrt{T_{b0}}} \cdot \sqrt{\frac{\kappa}{R}} \cdot CA_t \sqrt{\frac{2}{\kappa-1}\left[\left(\frac{P_b}{P_{30}}\right)^{\frac{1-\kappa}{\kappa}} - 1\right]}} = \tag{7}$$

$$\frac{\frac{1}{\sqrt{T_b}}\sqrt{\left[\left(\frac{P_b}{P_3}\right)^{\frac{1-\kappa}{\kappa}} - 1\right]}}{\frac{1}{\sqrt{T_{b0}}}\sqrt{\left[\left(\frac{P_b}{P_{30}}\right)^{\frac{1-\kappa}{\kappa}} - 1\right]}}$$

where
$$\begin{cases} \frac{P_b}{P_X} = \frac{P_b}{P_X} & \text{when } \left(\frac{2}{\kappa+1}\right)^{\frac{\kappa}{\kappa-1}} < \frac{P_b}{P_X} \\ = \left(\frac{2}{\kappa+1}\right)^{\frac{\kappa}{\kappa-1}} & \text{when } \left(\frac{2}{\kappa+1}\right)^{\frac{\kappa}{\kappa-1}} \geq \frac{P_b}{P_X}, \end{cases}$$

$\eta$ is a correction calculation parameter, $P_{30}$ is an exhaust pressure for pre-correction volumetric efficiency equivalent value, $\kappa$ is a specific heat ratio, $P_X$ is $P_3$ or $P_{30}$, $P_b$ is an intake manifold pressure, and $P_3$ is an exhaust pressure.

By correcting the pre-correction volumetric efficiency equivalent value $K_{v0}$ in accordance with Equation (9) below using $\eta'$ as a correction calculation parameter, it becomes possible to calculate an amount of cylinder suction air with accuracy according to an operating condition independently of a variance of the exhaust pressure even in a turbocharged engine. When a correction is made in accordance with Equation (7) above during the actual engine control, besides the manifold pressure $P_{b0}$, it is also necessary to store an intake manifold temperature $T_{b0}$ in the map with axes representing the intake manifold pressure and the engine speed. When configured in this manner, a memory capacity required to store a map of the intake manifold temperature $T_{b0}$ increases. To avoid this inconvenience, considering that influences of the intake manifold temperatures $T_{30}$ and $T_3$ are quite small in comparison with influences of the intake manifold pressures $P_{30}$ and $P_3$ in Equation (7) above, the pre-correction volumetric efficiency equivalent value $K_{v0}$ is corrected in accordance with Equation (8) below obtained by omitting $\sqrt{T_{b0}/T_b}$ from Equation (7) above as the correction calculation parameter $\eta$.

[Mathematical Formula 8]

$$\eta = \sqrt{\frac{\left\{\left[\left(\frac{P_b}{P_3}\right)^{\frac{1-\kappa}{\kappa}} - 1\right]\right\}}{\left\{\left[\left(\frac{P_b}{P_{30}}\right)^{\frac{1-\kappa}{\kappa}} - 1\right]\right\}}} \tag{8}$$

where
$$\begin{cases} \frac{P_b}{P_X} = \frac{P_b}{P_X} & \text{when } \left(\frac{2}{\kappa+1}\right)^{\frac{\kappa}{\kappa-1}} < \frac{P_b}{P_X} \\ = \left(\frac{2}{\kappa+1}\right)^{\frac{\kappa}{\kappa-1}} & \text{when } \left(\frac{2}{\kappa+1}\right)^{\frac{\kappa}{\kappa-1}} \geq \frac{P_b}{P_X} \end{cases}$$

$\eta$ is a correction calculation parameter, $P_{30}$ is an exhaust pressure for pre-correction volumetric efficiency equivalent value, $\kappa$ is a specific heat ratio, $P_X$ is $P_3$ or $P_{30}$, $P_b$ is an intake manifold pressure, and $P_3$ is an exhaust pressure.

A method of correcting the pre-correction volumetric efficiency equivalent value $K_{v0}$ on the basis of the correction calculation parameter η will now be described.

Firstly, a relation of the volumetric efficiency equivalent value $K_v$ and the internal EGR ratio will be described. The volumetric efficiency equivalent value $K_v$ is an index of an amount of cylinder suction air. For example, it indicates that the entire cylinder displacement is filled with an amount of cylinder suction air when the volumetric efficiency equivalent value $K_v=1$, whereas it indicates that the entire cylinder displacement is filled with a burned gas when the volumetric efficiency equivalent value $K_v=0$. As has been described, the internal EGR ratio indicates a ratio of the burned gas in the cylinder when the intake valve is closed. It is therefore assumed that $1-K_v$ and the internal EGR ratio×100 are equivalent or correlated. Hence, the inventors of the invention confirmed a relation of the internal EGR ratio with respect to $1-K_v$ by a simulation in actual use.

Figure 16:
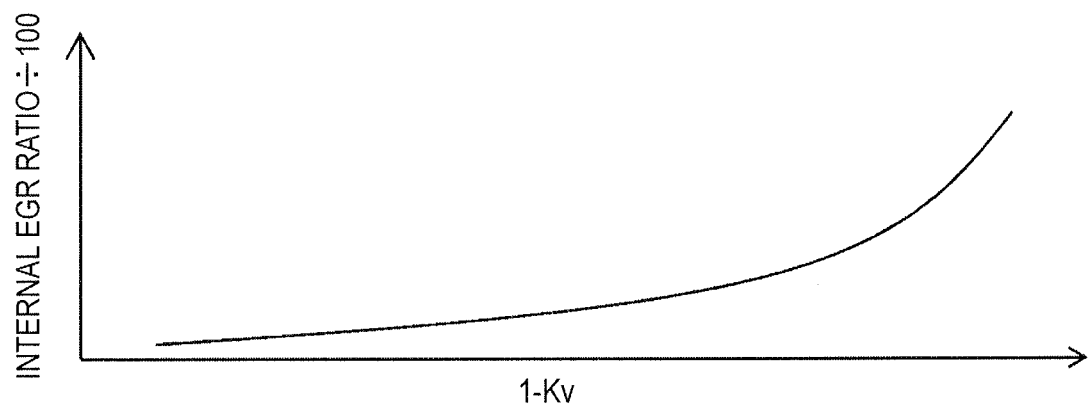
FIG. 16 is an image view showing a relation of the internal EGR ratio with respect to 1−volumetric efficiency equivalent value at each opening degree of a W/G valve and each intake manifold pressure at the same engine speed.

FIG. 16 is an image view showing a relation of the internal EGR ratio with respect to $1-K_v$ at the respective opening degrees (from being fully opened to fully closed) of the W/G valve and the respective intake manifold pressures at the same engine speed.

In FIG. 16, the abscissa is used for $1-K_v$ and the ordinate is used for the internal EGR ratio÷100 (1 when the internal EGR ratio is 100%). The volumetric efficiency equivalent value $K_v$ is calculated in accordance with Equation (1) above at the respective opening degrees of the W/G value and at the respective intake manifold pressures. As is shown in FIG. 16, although $1-K_v$ and the internal EGR ratio÷100 are not equivalent, it can be understood that the internal EGR ratio÷100 with respect to $1-K_v$ is unique independently of the intake manifold pressure and the opening degree of the W/G valve, and that $1-K_v$ and the internal EGR ratio are correlated with each other. By considering that $1-K_v$ and the internal EGR ratio are correlated with each other and that an amount of the exhaust gas flown back from the exhaust path 26 to the cylinder 10 has influences on the internal EGR ratio as described above, a correction of the volumetric efficiency equivalent value $K_{v0}$ using the correction calculation parameter expressed by Equation (8) above and the pre-correction volumetric efficiency equivalent value $K_{v0}$ is expressed by Equation (9) as follows:

[Mathematical Formula 9]

$$K_{v\_new} = 1 - (1 - K_{v0}) \times \eta \qquad (9)$$

where $K_{v\_new}$ is a post-correction volumetric efficiency equivalent value and $K_{v0}$ is a pre-correction volumetric efficiency equivalent value.

By using the post-correction volumetric efficiency equivalent value $K_{v\_new}$, it becomes possible to calculate an amount of cylinder suction air with accuracy according to an operating condition and independently of a variance of the exhaust pressure even in a turbocharged engine.

Figure 17:
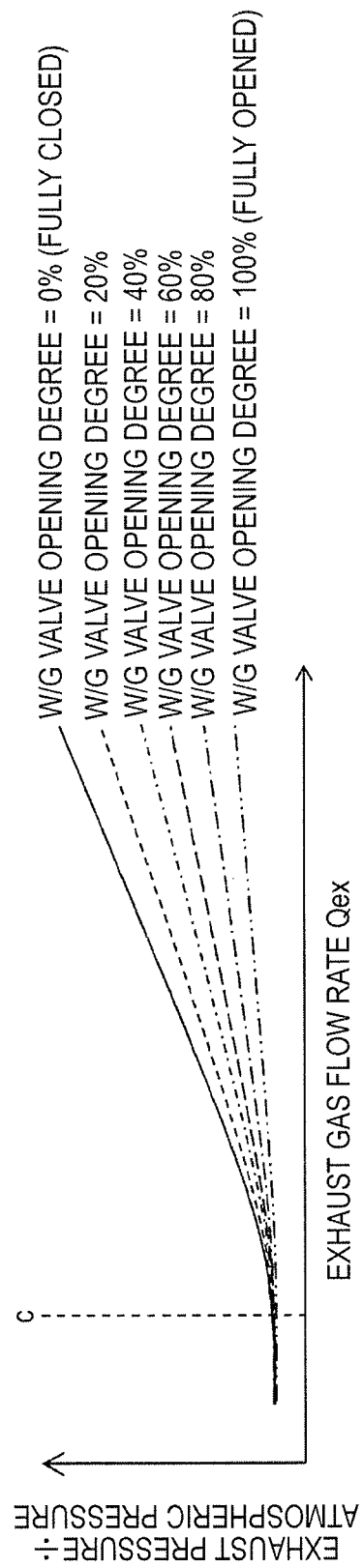
FIG. 17 shows an image view indicating a relation of the exhaust pressure÷atmospheric pressure with respect to an exhaust gas flow rate.

The inventors confirmed by a simulation in actual use that a relation of the exhaust pressure÷atmospheric pressure with respect to an exhaust gas flow rate released from the cylinder 10 is as shown in FIG. 17.

FIG. 17 is an image view showing a relation of the exhaust pressure÷atmospheric pressure with respect to an exhaust gas flow rate $Q_{ex}$. The abscissa is used for the exhaust gas flow rate $Q_{ex}$ and the ordinate is used for the exhaust pressure÷atmospheric pressure. Herein, not the exhaust pressure but the exhaust pressure÷atmospheric pressure is used for the reason that consideration is given to the driving at high altitudes under relatively low atmospheric pressure in comparison with the driving at the level ground. In FIG. 17, a solid line indicates the relation of the exhaust pressure÷atmospheric pressure with respect to an exhaust gas flow rate released from the cylinder 10 when an opening degree of the W/G valve=0% (fully closed), a broken line indicates the relation when an opening degree of the W/G valve=20%, an alternate long and short dash line indicates the relation when an opening degree of the W/G valve=40%, a long broken line indicates the relation when an opening degree of the W/G valve=60%, a long chain line indicates the relation when an opening degree of the W/G valve=80%, and a long two-dot chain line indicates the relation when an opening degree of the W/G valve=100% (fully opened).

In FIG. 17, in a region where the exhaust gas flow rate is lower than the one on a vertical broken line C, the exhaust pressure÷atmospheric pressure is substantially equal because an amount of the exhaust gas flown into the turbine is small independently of an opening degree of the W/G valve. In a region where the exhaust gas flow rate is higher than the one on the vertical broken line C, the relations show a tendency that the exhaust pressure÷atmospheric pressure increases as the exhaust gas flow rate becomes higher. Also, because an amount of the exhaust gas diverted to the bypass passage increases (an amount flown into the turbine decreases) as the W/G valve opens toward the opening side even at the same exhaust gas flow rate, the relation shows a tendency that the exhaust pressure÷atmospheric pressure becomes lower. In addition, the exhaust pressure÷atmospheric pressure with respect to the exhaust gas flow rate and to the opening degree of the W/G valve is unique independently of the intake manifold pressure and the engine speed. Hence, by storing the exhaust pressure÷atmospheric pressure preliminarily obtained in the respective operating ranges of the engine of interest by a simulation in actual use into a map with axes representing the exhaust gas flow rate and the opening degree or the opening degree indicated value of the W/G valve, it becomes possible to calculate the exhaust pressure÷atmospheric pressure using the exhaust gas flow rate and the opening degree or the opening degree indicated value of the W/G valve and to calculate the exhaust pressure by multiplying the exhaust pressure÷atmospheric pressure by atmospheric pressure during actual engine control.

A calculation method of the exhaust gas flow rate during actual engine control will now be described. An exhaust gas flow rate at a given time point n is a sum of an amount of cylinder suction air into a cylinder, which is in the exhaust stroke at the time point n, back in the intake stroke before the expansion stroke and the compression stroke and an amount of fuel. An amount of fuel can be calculated by dividing an amount of cylinder suction air in the intake stroke by a currently set target air-fuel ratio or by dividing an amount of cylinder suction air in the intake stroke by an actual air-fuel ratio at a given time point n. For example, in a case where a target air-fuel ratio is used, an amount of fuel can be calculated as is expressed by Equation (10) as follows:

[Mathematical Formula 10]

$$Q_{ex}(n) = Q(n-3) \times \left(1 + \frac{1}{AF_t(n-3)}\right) \qquad (10)$$

where $Q_{ex}(n)$ is an exhaust gas flow rate [g/sec] at a given time point n, $Q(n-3)$ is an amount [g/sec] of cylinder suction air three stroke before the given time point n, and $AF_t(n-3)$ is a target air-fuel ratio three strokes before the given time point n.

In a case where an actual air-fuel ratio is used, an amount of fuel can be calculated by replacing $AF_t(n-3)$ in Equation (10) above with an actual air-fuel ratio $AF(n)$ at a given time point n.

Owing to the configuration above, there can be achieved an advantage that an amount of cylinder suction air can be calculated with accuracy independently of a variance of the exhaust pressure even in a turbocharged engine.

Figure 1:
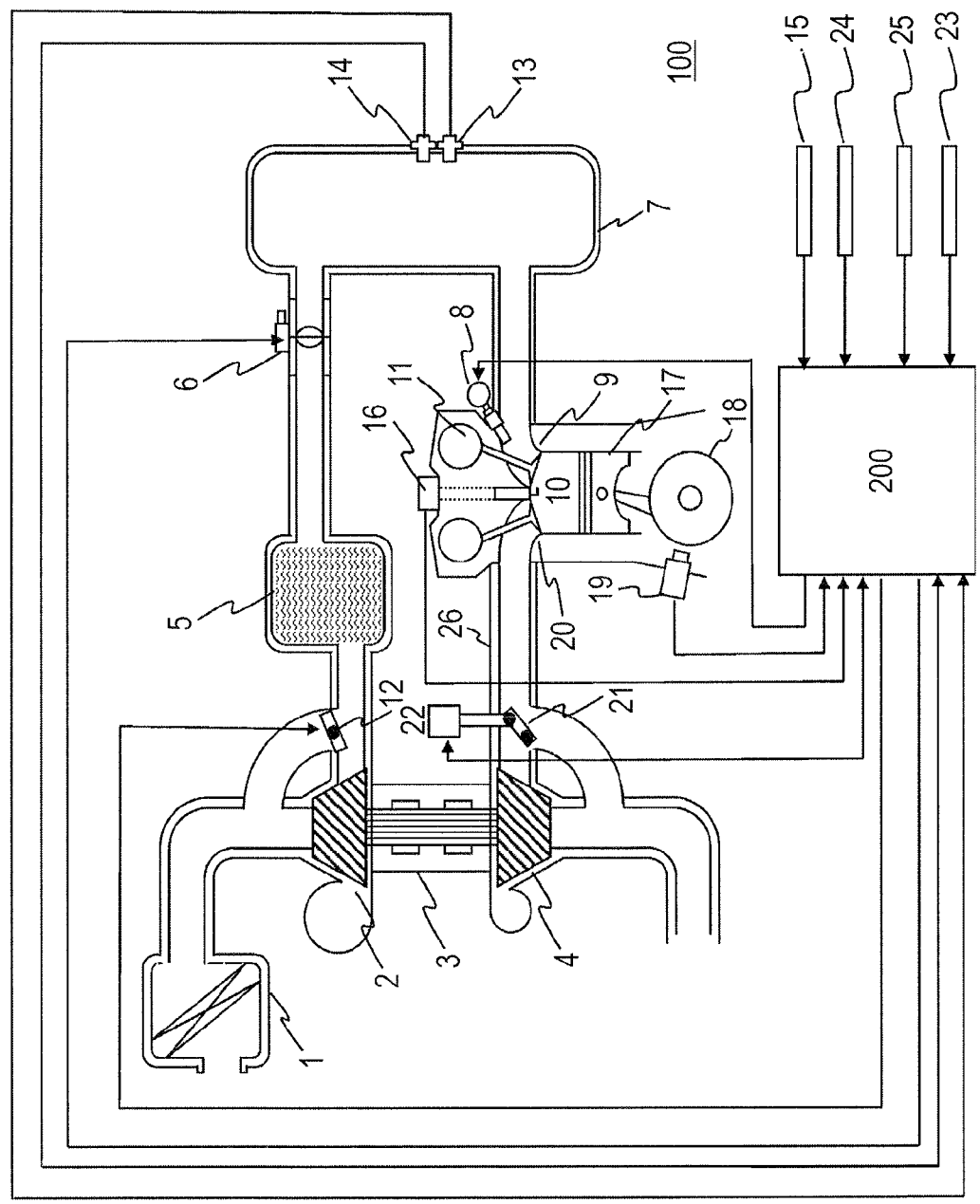
FIG. 1 is a view schematically showing a configuration of an internal combustion engine according to a first embodiment of the invention.

Hereinafter, the first embodiment of the invention will be described in detail with reference to the drawings. FIG. 1 is a view schematically showing a configuration of an internal combustion engine 100 of the first embodiment. Air is introduced into the internal combustion engine 100 by passing through an air cleaner 1. The introduced air is supercharged by rotations of a compressor 2. The compressor 2 is connected to a turbine 4 via a turbine shaft 3. The turbine 4 rotates with energy of an exhaust gas. The air supercharged by the compressor 2 passes through an intercooler 5 and is turned to an air-fuel mixture by fuel injection from an injector 8 by flowing through a throttle valve 6 that regulates an amount of suction air and an intake manifold 7 which is a portion including a surge tank and a intake manifold located downstream of the throttle valve 6. The air-fuel mixture is then sucked into a cylinder 10 by passing through an intake valve 9.

The intake valve 9 is provided with an intake VVT 11 that makes valve opening and closing timing variable. An air bypass valve 12 that controls a flow rate of air in a bypass passage connecting an upper stream and a lower stream of the compressor 2, an intake manifold temperature sensor 13 that measures a temperature in the intake manifold 7, and an intake manifold pressure sensor 14 that measures a pressure in the intake manifold 7 are installed on a passage through which air is sucked in. Also, a throttle opening degree sensor 15 is built into the throttle valve 6. A cylinder head is provided with an ignition coil 16 used to drive a sparking plug. The air-fuel mixture sucked into the cylinder 10 burns when ignited by the sparking plug and turns to a burned gas. A piston 17 is present inside the cylinder 10 and a crank shaft 18 is connected to the piston 17. The crank shaft 18 is rotated as the piston 17 is moved up and down by a combustion gas. An unillustrated crank plate is attached to the crank shaft 18. The crank plate has a protrusion and a crank angle sensor 19 detects a crank angle position, a predetermined crank angle interval, and an engine speed by detecting the protrusion. In short, the crank angle sensor 19 functions as a rotation speed detection portion of the internal combustion engine 100.

The burned gas in the cylinder 10 is released by passing through an exhaust valve 20. The exhaust gas rotates the turbine 4 when released. Also, there is a passage that bypasses an upper stream and a lower stream of the turbine 4 and an amount of the exhaust gas introduced into the turbine 4 is regulated by a W/G valve 21 provided to this bypass passage. The W/G valve 21 is connected to a motor-driven W/G valve actuator 22. The W/G valve 21 is operated to open and close by driving the W/G valve actuator 22 and an exhaust gas flow rate in the bypass passage is regulated by this opening and closing operation. It should be appreciated that the W/G valve actuator 22 is not limited to a motor-driven type and an actuator of a positive pressure type that uses an upstream pressure of the throttle valve 6 as a drive source may be used instead. Unillustrated $O_2$ sensor and catalyst and the like are provided to an exhaust path 26.

Figure 2:
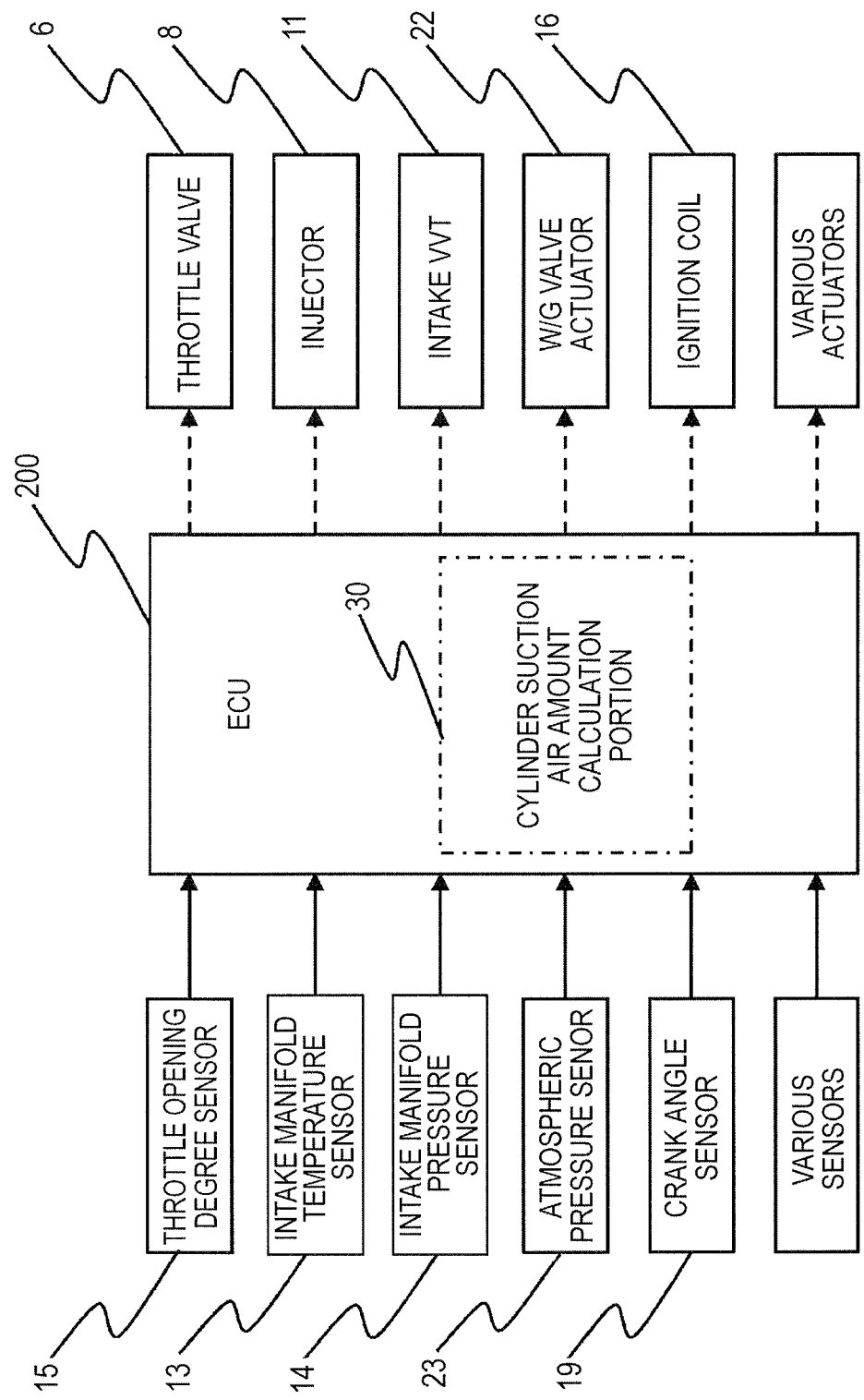
FIG. 2 is a block diagram showing a control portion of the internal combustion engine according to the first embodiment of the invention.

FIG. 2 is a block diagram showing a control portion of the internal combustion engine 100 of the first embodiment. An opening degree of the throttle valve 6 measured by the throttle opening degree sensor 15, an intake manifold temperature measured by the intake manifold temperature sensor 13, an intake manifold pressure measured by the intake manifold pressure sensor 14, atmospheric pressure measured by an atmospheric pressure sensor 23, and a crank angle detection signal measured by the crank angle sensor 19 are inputted into an ECU 200. Measurement values other than those specified above are inputted into the ECU 200 also from various sensors (for example, a water temperature sensor 24 and an accelerator position sensor 25).

In the ECU 200, an amount of cylinder suction air is calculated in a cylinder suction air amount calculation portion 30 described in detail below. The injector 8 and the ignition coil 16 are driven according to an amount of cylinder suction air calculated herein. Also, on the basis of an amount of cylinder suction air and various types of input data, a throttle opening degree indicated value, an intake VVT phase angle indicated value, and a W/G valve opening degree indicated value are calculated. An opening degree of the throttle valve 6, a phase angle of the intake VVT 11, and an opening degree of the W/G valve 21 are controlled so as to achieve the respective indicated values. Various other actuators are also controlled when a need arises. Also, assume that the ECU 200 has a memory region in which to save an amount of cylinder suction air, Q, up to three strokes before and a target air-fuel ratio $AF_t$ up to three strokes before, which will be described below.

Figure 3:
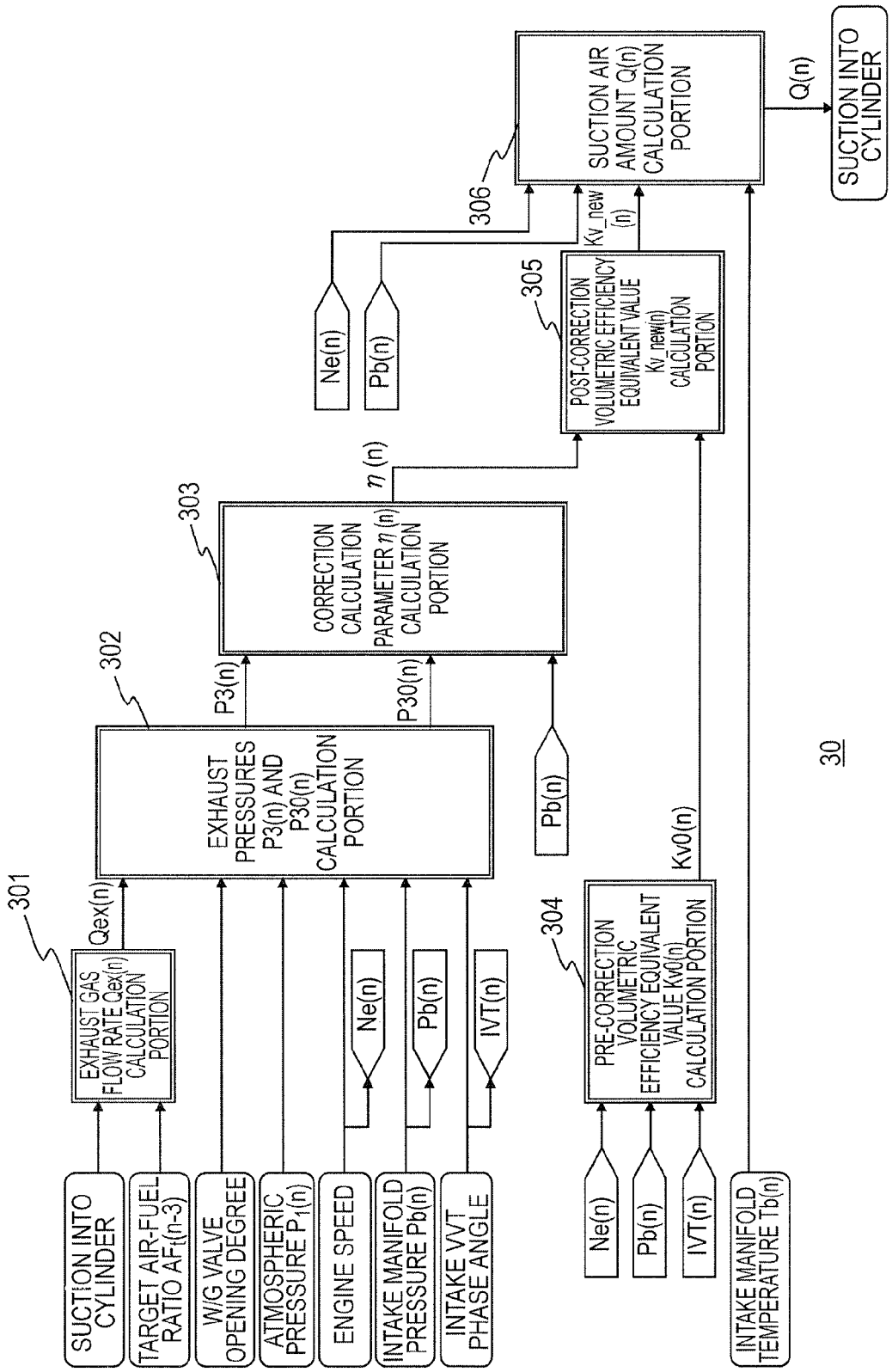
FIG. 3 is a block diagram showing a cylinder suction air amount calculation portion according to the first embodiment of the invention.

FIG. 3 is a block diagram showing the cylinder suction air amount calculation portion 30. The cylinder suction air amount calculation portion 30 includes, as a portion that calculates a correction calculation parameter η of a pre-correction volumetric efficiency equivalent value $K_{v0}$, an exhaust gas flow rate $Q_{ex}(n)$ calculation portion 301, an exhaust pressures $P_3(n)$ and $P_{30}(n)$ calculation portion 302, and a correction calculation parameter $η(n)$ calculation portion 303. The cylinder suction air amount calculation portion 30 also includes a pre-correction volumetric efficiency equivalent value $K_{v0}(n)$ calculation portion 304 that calculates a pre-correction volumetric efficiency equivalent value $K_{v0}$, a post-correction volumetric efficiency equivalent value $K_{v\_new}(n)$ calculation portion 305 that corrects the pre-correction volumetric efficiency equivalent value $K_{v0}$, and a suction air amount $Q(n)$ calculation portion 306 that calculates an amount of cylinder suction air, $Q(n)$. Hereinafter, the cylinder suction air amount calculation portion 30 will be described using FIG. 3 and subsequent drawings.

Firstly, of the portions included in the cylinder suction air amount calculation portion 30, the exhaust gas flow rate $Q_{ex}(n)$ calculation portion 301 of FIG. 3 will be described.

Figure 4:
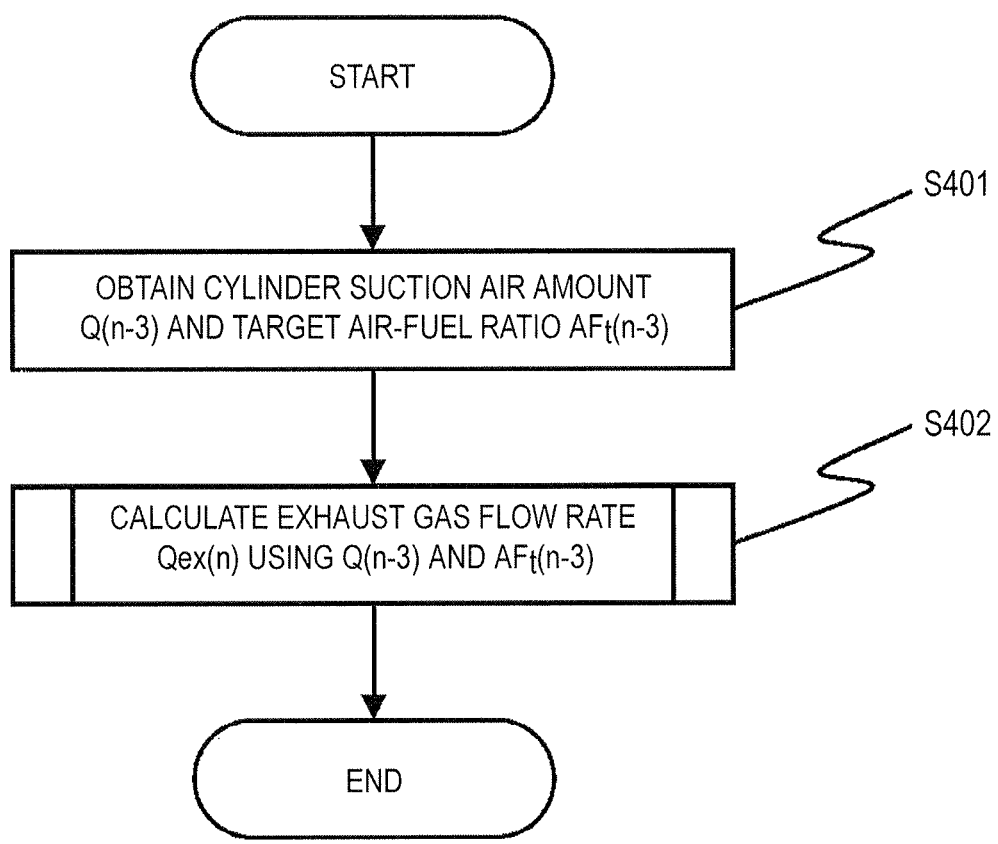
FIG. 4 is a flowchart along which an exhaust gas flow rate is calculated in the first embodiment of the invention.

The exhaust gas flow rate $Q_{ex}(n)$ calculation portion 301 calculates an exhaust gas flow rate $Q_{ex}(n)$ necessary to calculate an exhaust pressure $P_3(n)$. FIG. 4 shows a flowchart of the exhaust gas flow rate $Q_{ex}(n)$ calculation portion 301.

In Step S401 of FIG. 4, an amount of cylinder suction air, $Q(n-3)$, and a target air-fuel ratio $AF_t(n-3)$ three stroke before are obtained. Regarding an amount of cylinder suction air, $Q(n-3)$, and a target air-fuel ratio $AF_t(n-3)$ three strokes before, as will be described below, it is configured in such a manner that after an amount of cylinder suction air, Q, and a target air-fuel ratio $AF_t$ are calculated in the suction air amount $Q(n)$ calculation portion 306, values up to three strokes before are successively saved in the memory in the ECU 200. In Step S402, an exhaust gas flow rate $Q_{ex}(n)$ is calculated in accordance with Equation (10) above using an amount of cylinder suction air, Q(n−3), and a target air-fuel ratio $AF_t$(n−3) three strokes before. As has been mentioned above, an actual air-fuel ratio detected by the $O_2$ sensor may be used instead of the target air-fuel ratio $AF_t$(n−3) three strokes before. In this case, the target air-fuel ratio $AF_t$(n−3) in Equation (10) above is replaced by an actual air-fuel ratio AF(n) and processing to successively save a target air-fuel ratio $AF_t$ in the memory in the ECU 200 described below becomes unnecessary.

The exhaust pressures $P_3$(n) and $P_{30}$(n) calculation portion 302 will now be described.

Figure 5:
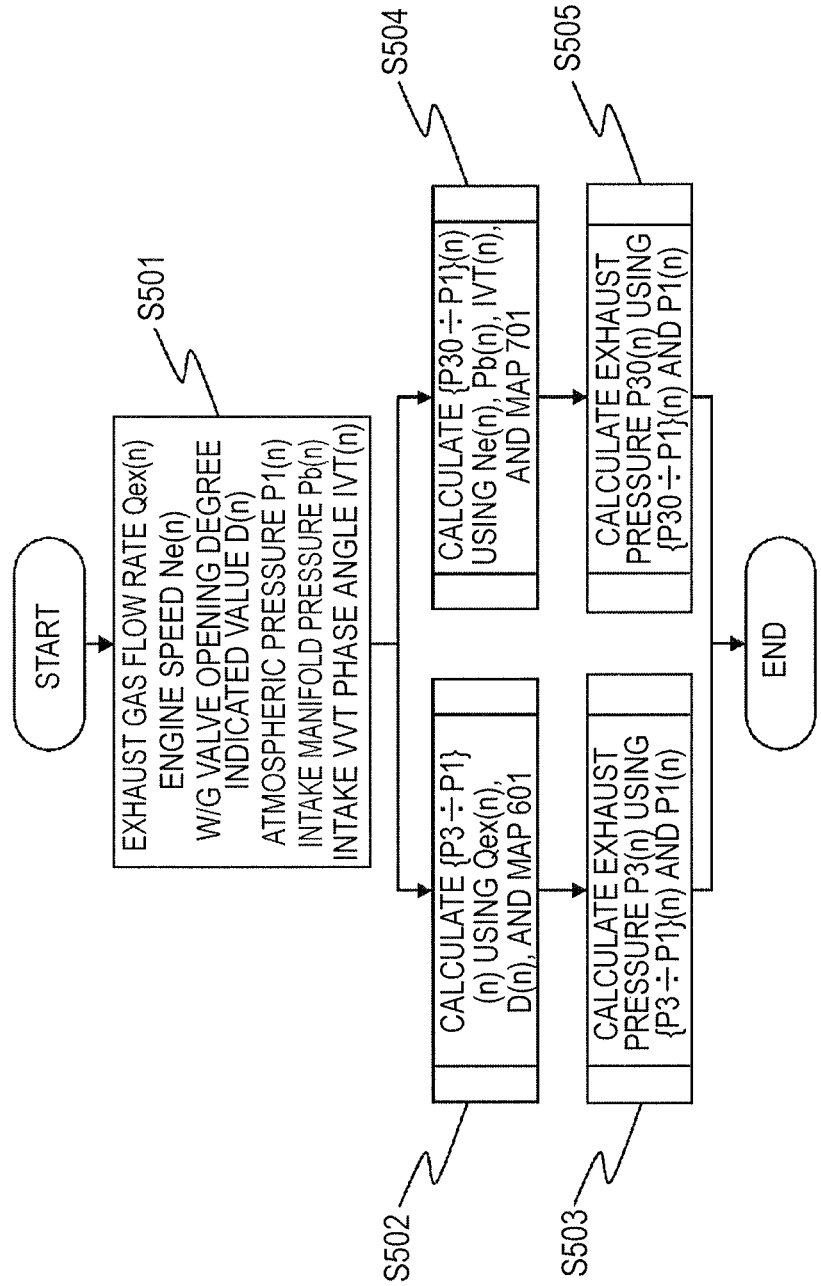
FIG. 5 is a flowchart along which an exhaust pressure is calculated in the first embodiment of the invention.

The exhaust pressures $P_3$(n) and $P_{30}$(n) calculation portion 302 calculates exhaust pressures $P_3$(n) and $P_{30}$(n) necessary to calculate the correction calculation parameter η(n). FIG. 5 shows a flowchart of the exhaust pressures $P_3$(n) and $P_{30}$(n) calculation portion 302.

In Step S501 of FIG. 5, an engine speed $N_e$(n), a W/G valve opening degree indicated value D(n), atmospheric pressure $P_1$(n), an intake manifold pressure $P_b$(n), an intake VVT phase angle IVT(n), and the exhaust gas flow rate $Q_{ex}$(n) calculated in the exhaust gas flow rate $Q_{ex}$(n) calculation portion 301 are obtained. Subsequently, the exhaust pressure $P_3$(n) is calculated in Steps S502 and S503 and the exhaust pressure $P_{30}$(n) is calculated in Steps S504 and S505.

Figure 6:
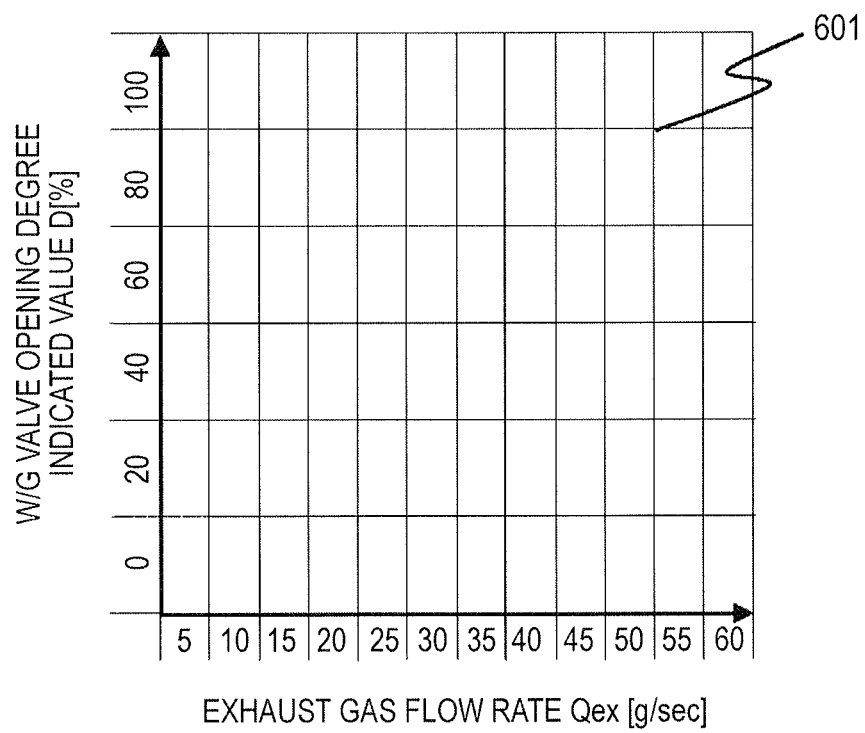
FIG. 6 is a view showing a map with which the exhaust pressure÷atmospheric pressure is calculated in the first embodiment of the invention.

For the exhaust pressure $P_3$(n), {exhaust pressure $P_3$÷atmospheric pressure $P_1$}(n) is calculated in Step S502 using the exhaust gas flow rate $Q_{ex}$(n), the W/G valve opening degree indicated value D(n) and a map 601 shown in FIG. 6. As has been described, a relation among the exhaust gas flow rate $Q_{ex}$, the W/G valve opening degree indicated value D, and the exhaust pressure $P_3$÷the atmospheric pressure $P_1$ of the engine of interest is preliminarily stored in the map 601 of FIG. 6 by a simulation in actual use. The map 601 has stored values of the exhaust pressure $P_3$÷the atmospheric pressure $P_1$ with axes presenting the exhaust gas flow rate $Q_{ex}$ and the W/G valve opening degree indicated value D. Herein, not the exhaust pressure but the exhaust pressure÷atmospheric pressure is used, as has been described above, with the purpose of calculating an exhaust pressure with accuracy even during the driving at high altitudes under relatively low atmospheric pressure in comparison with the driving at the level ground. In Step S503, the exhaust pressure $P_3$(n) is calculated by multiplying {exhauster pressure $P_3$÷atmospheric pressure $P_1$}(n) calculated in Step S502 by the atmospheric pressure $P_1$(n) obtained in Step S501. In a case where a sensor that detects an actual opening degree of the W/G valve 21 is provided to the W/G valve 21 or the W/G valve actuator 22, an actual opening degree of the W/G valve 21 may be used instead of the W/G valve opening degree indicated value.

Figure 7:
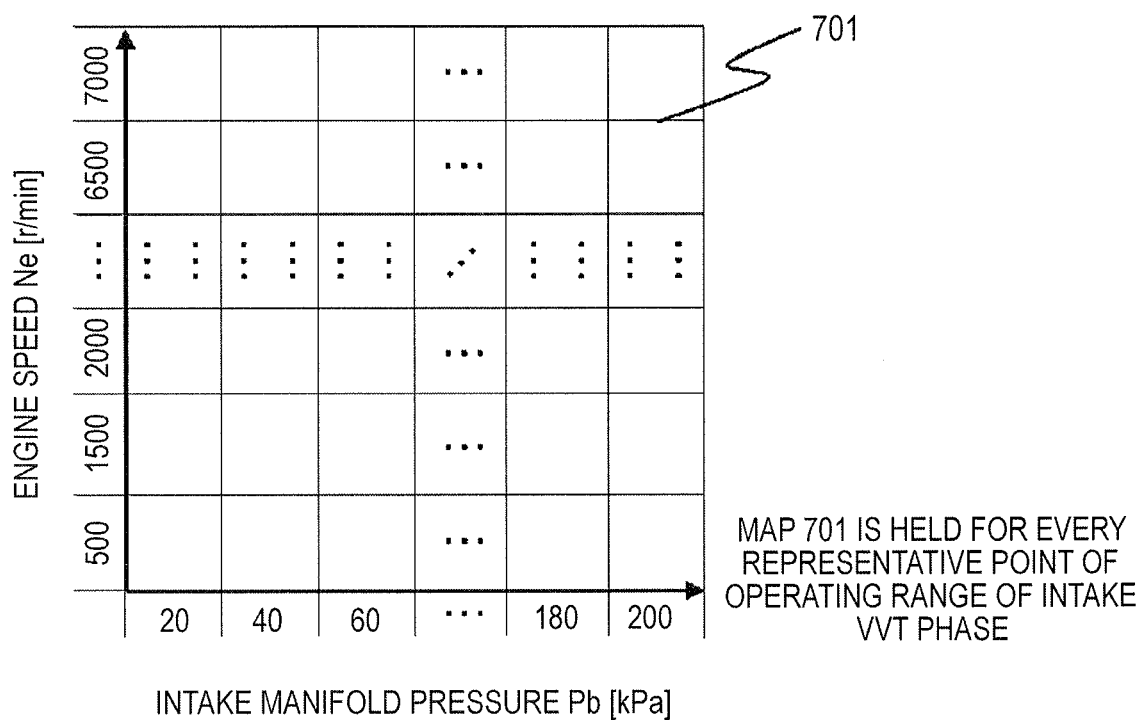
FIG. 7 is a view showing another map with which the exhaust pressure÷atmospheric pressure is calculated in the first embodiment of the invention.

For the exhaust pressure $P_{30}$(n) with respect to the pre-correction volumetric efficiency equivalent value $K_{v0}$, {exhaust pressure $P_{30}$÷atmospheric pressure $P_1$}(n) is calculated in Step S504 using an engine speed $N_e$(n), an intake manifold pressure $P_b$(n), an intake VVT phase angle IVT(n), and a map 701 shown in FIG. 7. A relation among an engine speed $N_e$, an intake manifold pressure $P_b$, an intake VVT phase angle IVT, and the exhaust pressure $P_{30}$÷the atmospheric pressure $P_1$ found by a simulation in actual use is preliminarily stored in the map 701 of FIG. 7. The map 701 has stored values of the exhaust pressure $P_{30}$÷the atmospheric pressure $P_1$ with respect to the pre-correction volumetric efficiency equivalent value $K_{v0}$ with axes representing the engines speed $N_e$ and the intake manifold pressure $P_b$. Herein, not the exhaust pressure but the exhaust pressure÷atmospheric pressure is used with the purpose of calculating an exhaust pressure with accuracy even during the driving at high altitudes under relatively low atmospheric pressure in comparison with the driving at the level ground as with the map 601. Also, this map 701 is held for every representative point of an operating range of the intake VVT phase angle IVT. When the intake VVT phase angle IVT is 0 to 50 degrees, the map 701 is held at each intake VVT phase angle IVT=0, 10, 20, 30, 40, and 50 degrees. The term, "the exhaust pressure $P_{30}$ with respect to the pre-correction volumetric efficiency equivalent value $K_{v0}$" referred to herein means, as described above, an exhaust pressure also obtained when map values of a map 1101 of the pre-correction volumetric efficiency equivalent value $K_{v0}$ described below are obtained by a simulation in actual use. The exhaust pressure $P_{30}$(n) is calculated in Step S505 by multiplying {exhaust pressure $P_{30}$÷atmospheric pressure $P_1$}(n) calculated in Step S504 by the atmospheric pressure $P_1$(n) obtained in Step S501.

In the case of a system provided with an exhaust pressure sensor that is not employed in this embodiment, because the exhaust pressure $P_3$(n) can be detected from the exhaust pressure sensor during the actual engine control, Step S502 and Step S503 and the map 601 performed by and used in the exhaust gas flow rate $Q_{ex}$(n) calculation portion 301 and the exhaust pressures $P_3$(n) and $P_{30}$(n) calculation portion 302 are unnecessary.

The correction calculation parameter η(n) calculation portion 303 will now be described.

Figure 8:
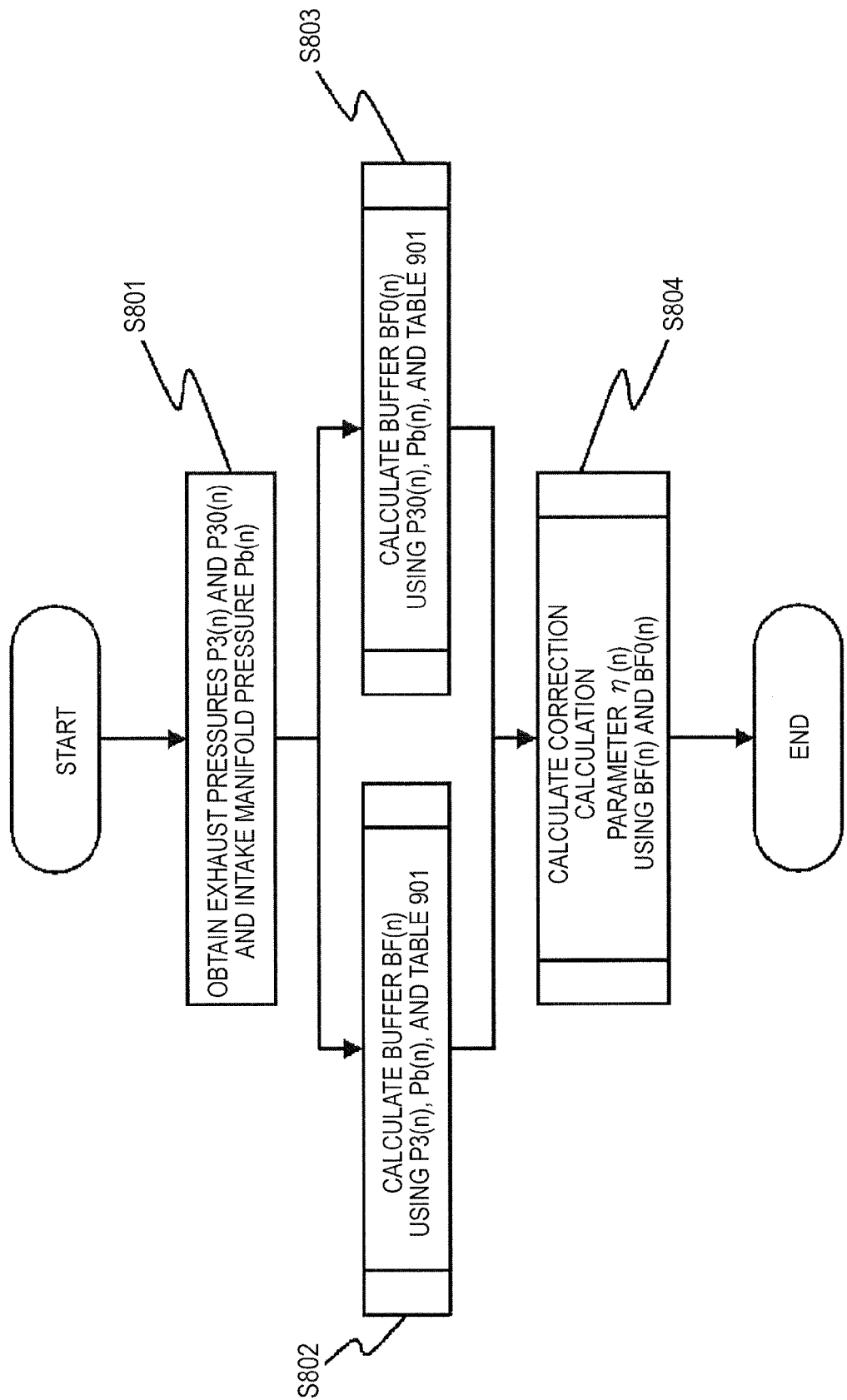
FIG. 8 is a flowchart along which a correction calculation parameter is calculated in the first embodiment of the invention.

The correction calculation parameter η(n) calculation portion 303 calculates a correction calculation parameter η(n) necessary to correct the pre-correction volumetric efficiency equivalent value $K_{v0}$(n). FIG. 8 shows a flowchart of the correction calculation parameter η(n) calculation portion 303.

In Step S801 of FIG. 8, an intake manifold pressure $P_b$(n) and the exhaust pressures $P_3$(n) and $P_{30}$(n) calculated in the exhaust pressures $P_3$(n) and $P_{30}$(n) calculation portion 302 are obtained.

Subsequently, a buffer BF(n) is calculated in Step S802 using an intake manifold pressure $P_b$(n), the exhaust pressure $P_3$(n), and a table 901 shown in FIG. 9. The buffer BF(n) corresponds to a numerator of the correction calculation parameter η(n) expressed by Equation (8) above. Also, a buffer $BF_0$(n) is calculated in Step S803 using an intake manifold pressure $P_b$(n), the exhaust pressure $P_{30}$(n), and the table 901. The buffer $BF_0$(n) corresponds to a denominator of the correction calculation parameter η(n) expressed by Equation (8) above.

Figure 9:
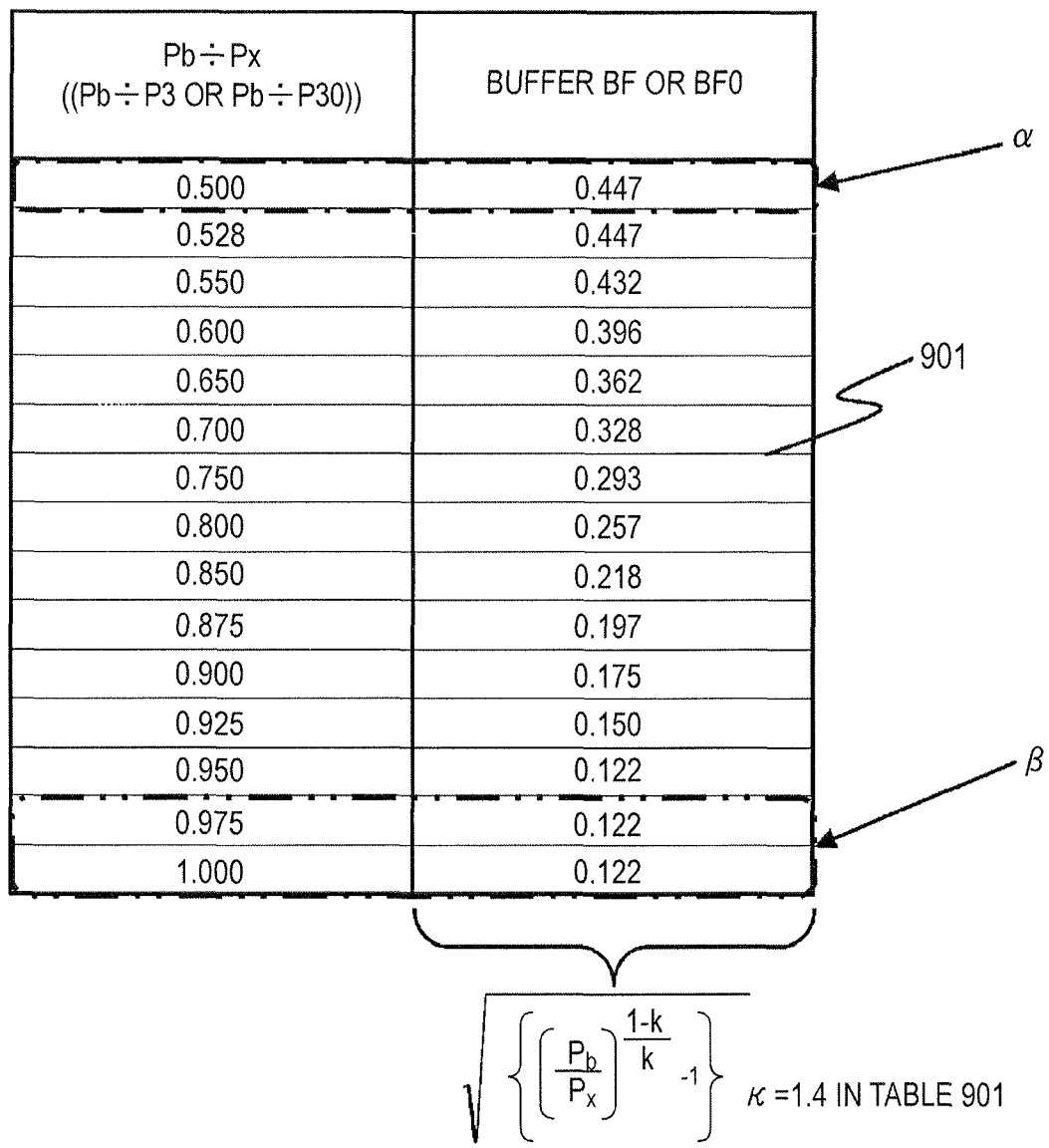
FIG. 9 is a view showing a table with which a value of a buffer with respect to an intake manifold pressure÷the exhaust pressure is calculated in the first embodiment of the invention.

As is shown in FIG. 9, the table 901 has stored values of the buffer BF or $BF_0$ for the intake manifold pressure $P_b$÷the exhaust pressure $P_3$ or the intake manifold pressure $P_b$÷the exhaust pressure $P_{30}$. Herein, the buffers BF and $BF_0$ are not measurement values but calculation values in accordance with Equation (8) above. In FIG. 9, a value same as the one when the intake manifold pressure $P_b$÷the exhaust pressure $P_X$=0.528 is stored in a row indicated by a Greek letter α by taking choking of a fluid into consideration and a value same as the one when the intake manifold pressure $P_b$÷the exhaust pressure $P_X$=0.95 is stored in rows indicated by a Greek letter β so as to prevent the buffers BF and $BF_0$ from varying excessively with a variance of the intake manifold pressure $P_b$÷the exhaust pressure $P_X$. After the buffer BF(n) is calculated in Step S802 and the buffer $BF_0$(n) is calculated in Step S803, the correction calculation parameter η(n) is calculated in Step S804 in accordance with Equation (8) above using the buffers BF(n) and $BF_0$(n).

Figure 10:
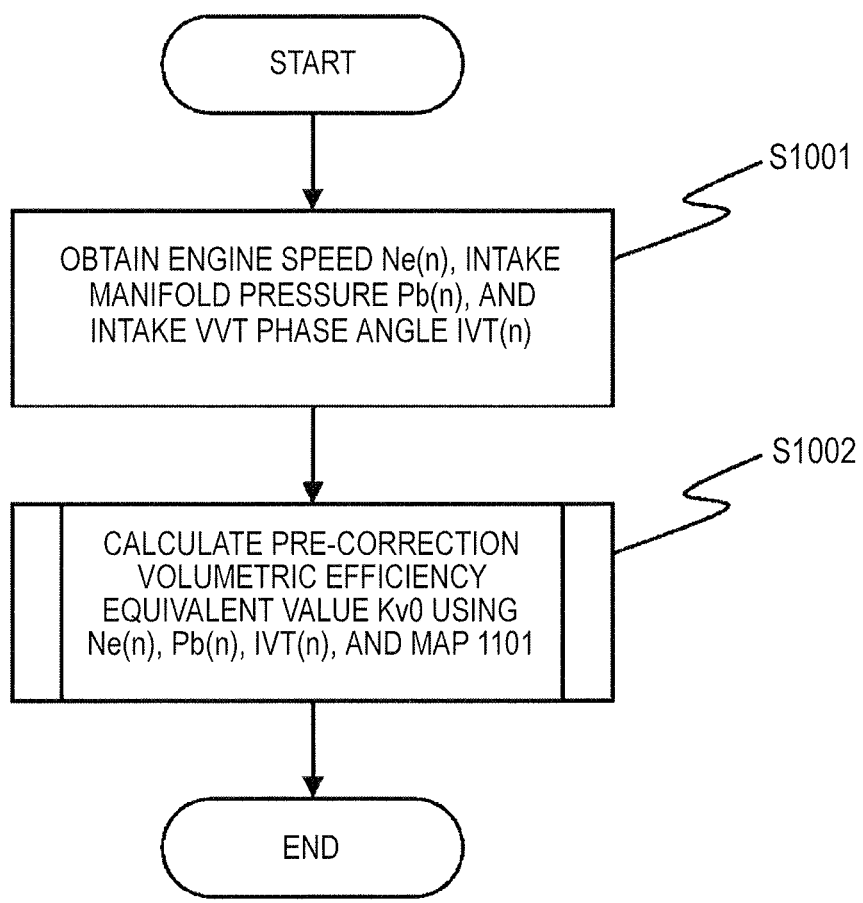
FIG. 10 is a flowchart along which a pre-correction volumetric efficiency equivalent value is calculated in the first embodiment of the invention.

The pre-correction volumetric efficiency equivalent value $K_{v0}(n)$ calculation portion 304 will now be described. The pre-correction volumetric equivalent value $K_{v0}(n)$ calculation portion 304 calculates a pre-correction volumetric efficiency equivalent value $K_{v0}(n)$. FIG. 10 shows a flowchart of the pre-correction volumetric efficiency equivalent value $K_{v0}(n)$ calculation portion 304.

Figure 11:
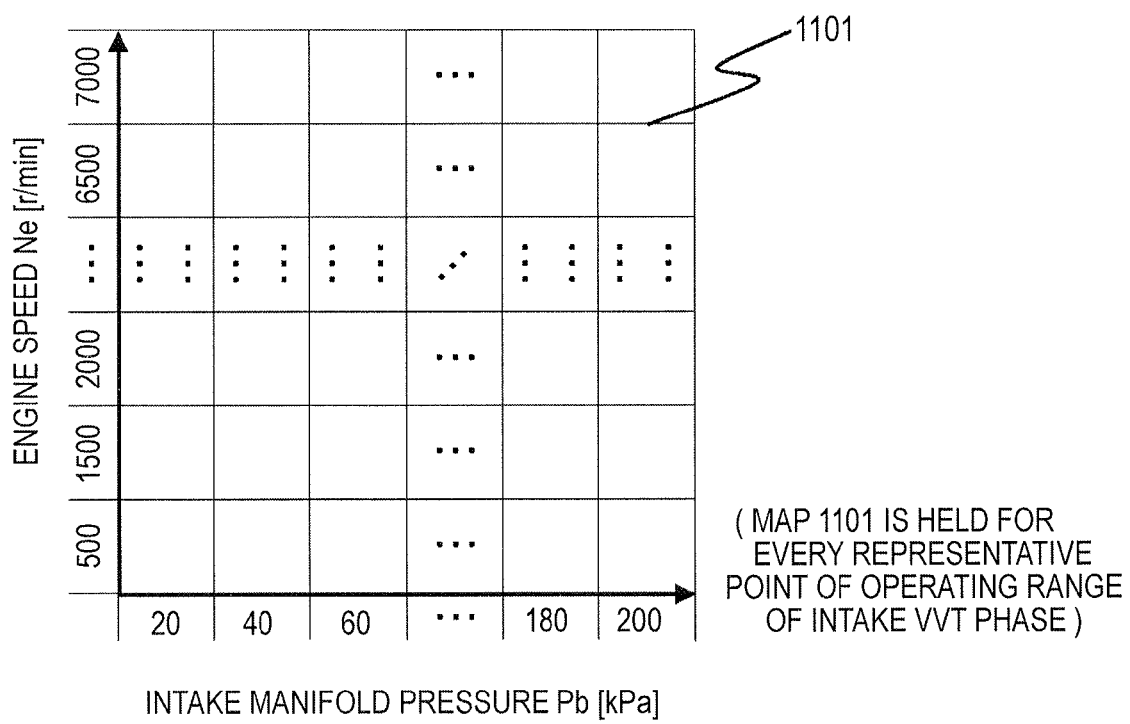
FIG. 11 is a view showing a map with which the pre-correction volumetric efficiency equivalent value is calculated in the first embodiment of the invention.

In Step S1001, an engine speed $N_e(n)$, an intake manifold pressure $P_b(n)$, and an intake VVT phase angle IVT(n) are obtained. Subsequently, the pre-correction volumetric efficiency equivalent value $K_{v0}$ is calculated in Step S1002 using the engine speed $N_e(n)$, the intake manifold pressure $P_b(n)$, the intake VVT phase angle IVT(n), and a map 1101 shown in FIG. 11. As has been described, a relation among an engine speed $N_e$, an intake manifold pressure $P_b$, an intake VVT phase angle IVT, and the pre-correction volumetric efficiency equivalent value $K_{v0}$ of the engine of interest is found by a simulation in actual use and preliminarily stored in the map 1101 shown in FIG. 11. The map 1101 has stored values of the pre-correction volumetric efficiency equivalent value $K_{v0}$ with axes representing the engine speed $N_e$ and the intake manifold pressure $P_b$. This map 1101 is held for every representative point of an operating range of the intake VVT phase angle IVT. In a case where the intake VVT phase angle IVT is from 0 to 50 degrees, for example, the map 1101 is held at each intake VVT phase angle IVT=0, 10, 20, 30, 40, and 50 degrees.

Figure 12:
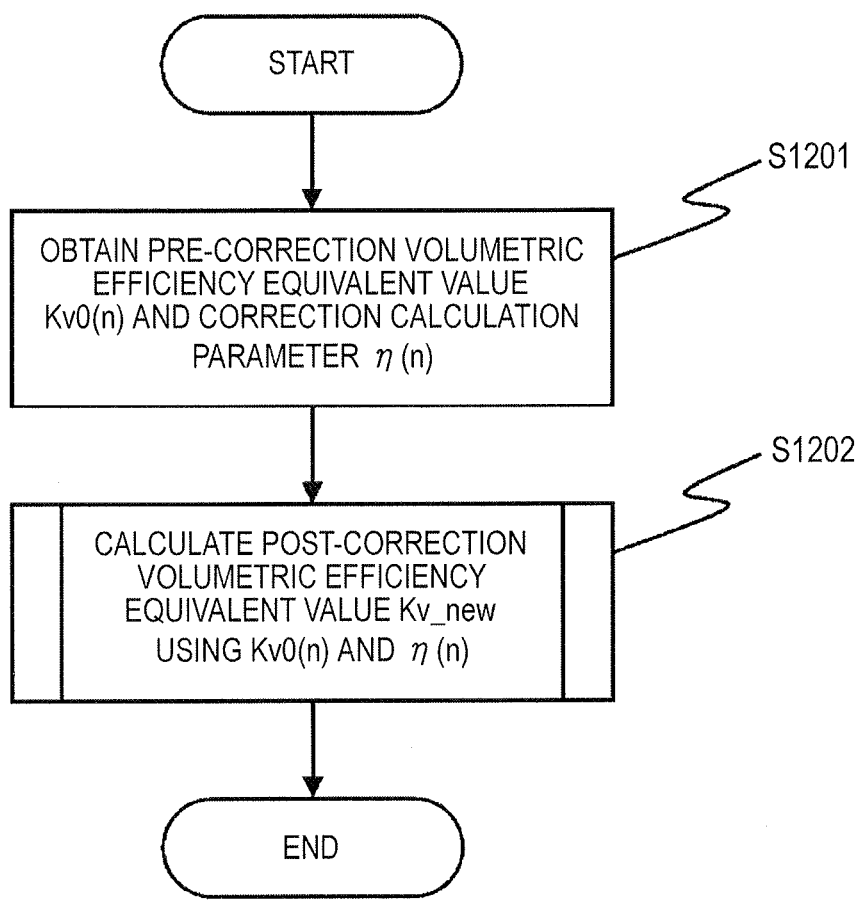
FIG. 12 is a flowchart along which a post-correction volumetric efficiency equivalent value is calculated in the first embodiment of the invention.

The post-correction volumetric efficiency equivalent value $K_{v\_new}(n)$ calculation portion 305 will now be described. The post-correction volumetric efficiency equivalent value $K_{v\_new}(n)$ calculation portion 305 corrects the pre-correction volumetric efficiency equivalent value $K_{v0}(n)$ using the correction calculation parameter $\eta(n)$. FIG. 12 shows a flowchart of the post-correction volumetric efficiency equivalent value $K_{v\_new}(n)$ calculation portion 305.

In Step S1201, the pre-correction volumetric efficiency equivalent value $K_{v0}(n)$ calculated in the pre-correction volumetric efficiency equivalent value $K_{v0}(n)$ calculation portion 304 and the correction calculation parameter $\eta(n)$ calculated in the correction calculation parameter $\eta(n)$ calculation portion 303 are obtained. Subsequently, the post-correction volumetric efficiency equivalent value $K_{vnew}$ is calculated in Step S1202 in accordance with Equation (9) above using the pre-correction volumetric efficiency equivalent value $K_{v0}(n)$ and the correction calculation parameter $\eta(n)$.

Figure 13:
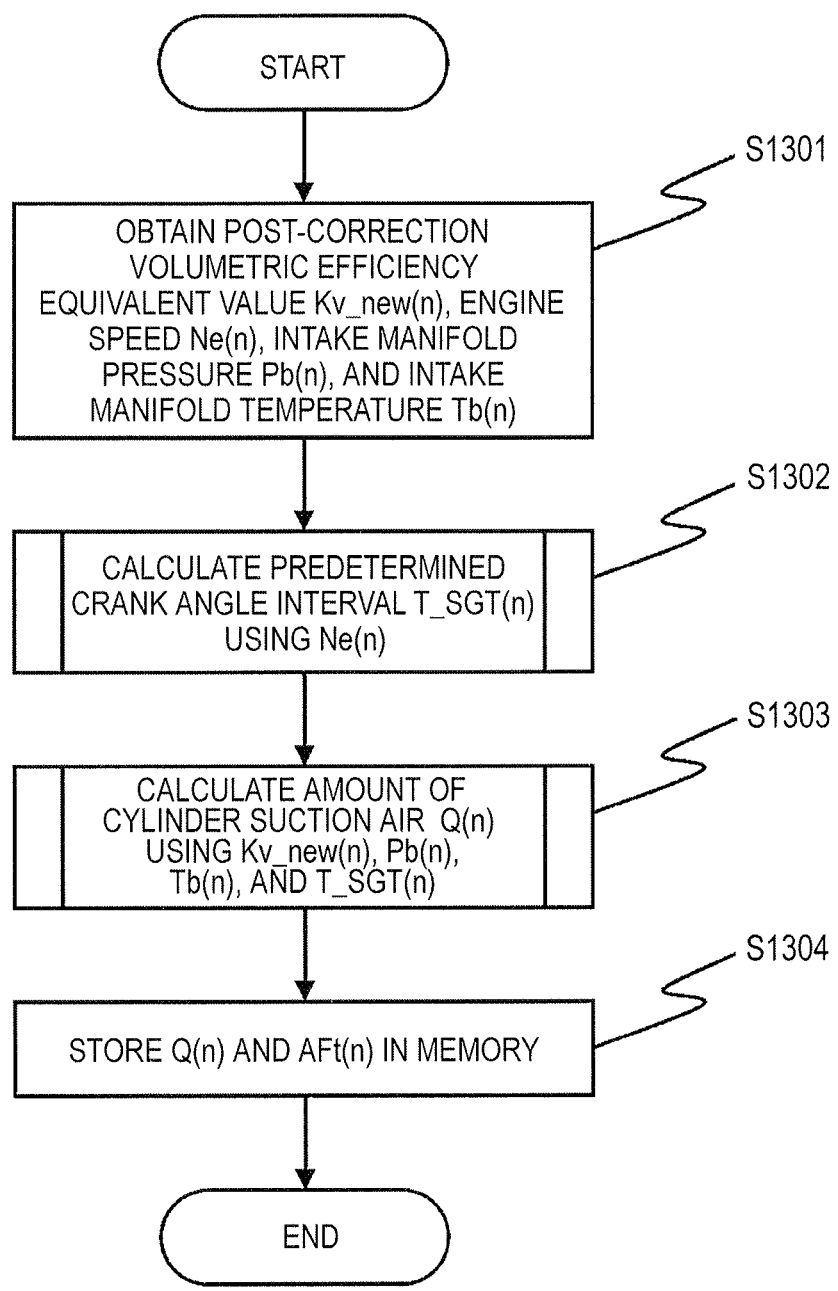
FIG. 13 is a flowchart along which an amount of cylinder suction air is calculated in the first embodiment of the invention.
Figure 14:
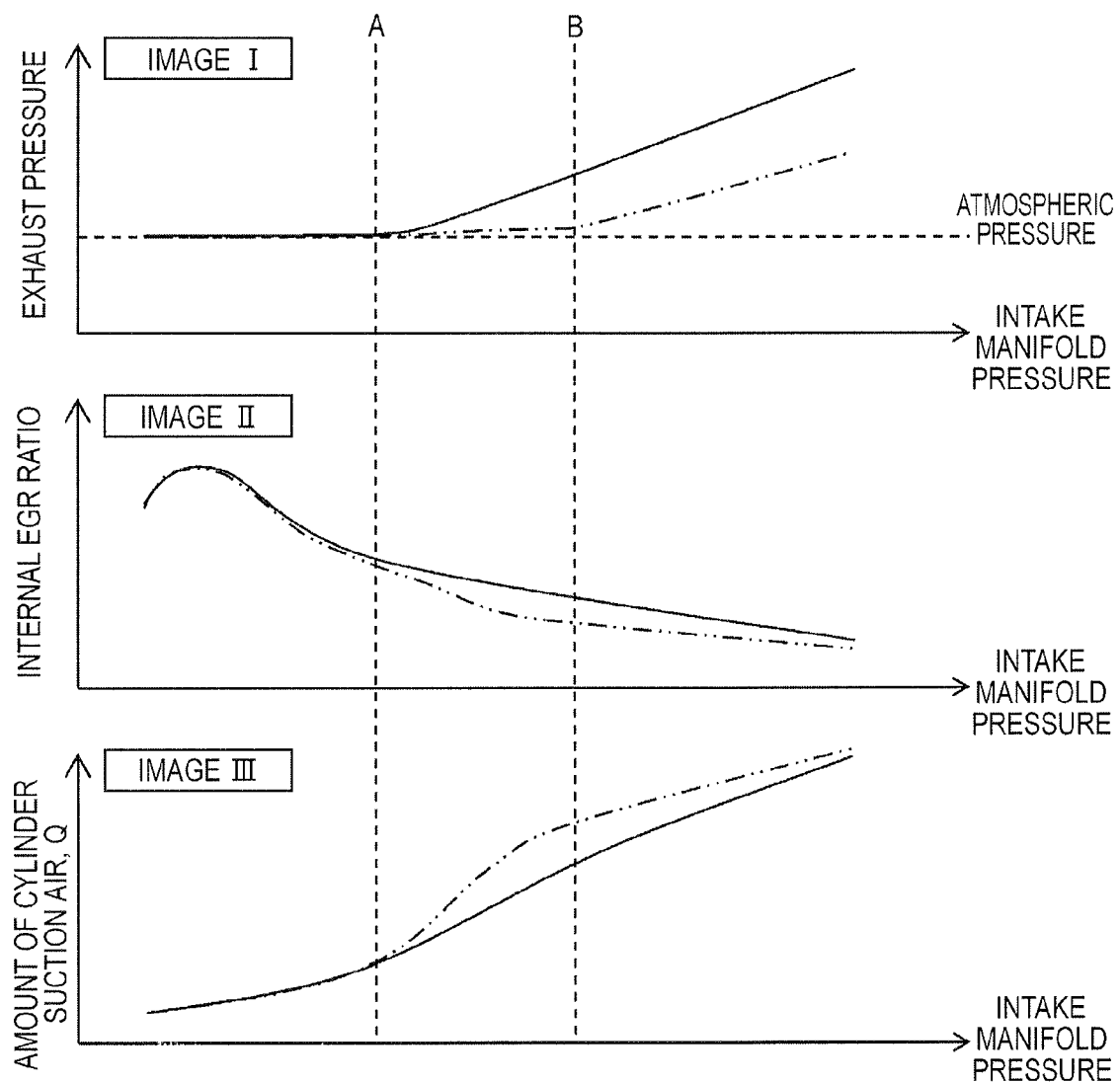
FIG. 14 shows image views indicating relations of an exhaust pressure, an internal EGR ratio, an amount of cylinder suction air with respect to an intake manifold pressure at the same engine rotation speed.

Finally, the cylinder suction air amount Q(n) calculation portion 306 will be described. The suction air amount Q(n) calculation portion 306 calculates an amount of cylinder suction air, Q(n). FIG. 13 shows a flowchart of the suction air amount Q(n) calculation portion 306.

In Step 1301, the post-correction volumetric efficiency equivalent value $K_{v\_new}(n)$ calculated in the post-correction volumetric efficiency equivalent value $K_{v\_new}(n)$ calculation portion 305, an engine speed $N_e(n)$, an intake manifold pressure $P_b(n)$, and an intake manifold temperature $T_b(n)$ are obtained. Subsequently, a predetermined crank angle interval T_SGT(n) is calculated in Step S1302 in accordance with Equation (1) above using the engine speed $N_e(n)$. An amount of cylinder suction air, Q(n), is calculated in Step S1303 in accordance with Equation (1) above using the post-correction volumetric efficiency equivalent value $K_{v\_new}(n)$, the intake manifold pressure $P_b(n)$, the intake manifold temperature $T_b(n)$, and the predetermined crank angle interval T_SGT(n). As has been described above, various control values are calculated on the basis of the amount of cylinder suction air, Q(n), calculated herein and various types of data inputted into the ECU 200.

In this embodiment, assume that the target air-fuel ratio $AF_t(n)$ is calculated using an intake manifold pressure $P_b$, an engine speed $N_e$, and a unillustrated target air-fuel ratio $AF_t$ map with axes representing the intake manifold pressure $P_b$ and the engine speed $N_e$. It should be appreciated, however, that a calculation method of the target air-fuel ratio $AF_t(n)$ is not limited to the above method. In Step S1304, the amount of cylinder suction air amount, Q(n), and the target air-fuel ratio $AF_t(n)$ are saved in the memory as described above. In a case where the exhaust gas flow rate $Q_{ex}(n)$ calculation portion 301 uses an actual air-fuel ratio instead of the target air-fuel ratio $AF_t(n)$, the processing to save the target air-fuel ratio $AF_t(n)$ in the memory becomes unnecessary as mentioned above.

As has been described, the control apparatus of an internal combustion engine of the first embodiment includes: the intake manifold pressure sensor 14 that detects an internal pressure of the intake manifold 7 formed of a portion including a surge tank and an intake manifold provided downstream of the throttle valve 6 as an intake manifold pressure; the intake manifold temperature sensor 13 that detects an internal intake temperature of the intake manifold 7 as an intake manifold temperature; the W/G valve 21 that is provided to a bypass passage bypassing the turbine 4 provided to the exhaust passage 26 of the internal combustion engine 100 and changes a passage sectional area of the bypass passage by changing an opening degree; the crank angle sensor 19 that detects a rotation speed of the internal combustion engine 100; the exhaust pressure calculation portion 302 that calculates a pressure in the exhaust path 26 provided upstream of the turbine 4 as an exhaust pressure; the pre-correction volumetric efficiency equivalent value $K_{v0}(n)$ calculation portion 304 that calculates a pre-correction volumetric efficiency equivalent value, which is an index indicating an amount of air entering the cylinder 10 from the intake manifold 7 at a predetermined opening degree or a predetermined opening degree indicated value of the W/G valve 21, on the basis of the intake manifold pressure and the rotation speed of the internal combustion engine 100; and the exhaust pressure calculation portion 302 for pre-correction volumetric efficiency equivalent value that calculates an exhaust pressure for pre-correction volumetric efficiency equivalent value, which is an exhaust pressure corresponding to the pre-correction volumetric efficiency equivalent value, on the basis of the intake manifold pressure and the rotation speed of the internal combustion engine 100. A correction calculation parameter is calculated using the exhaust pressure, the exhaust pressure for pre-correction volumetric efficiency equivalent value, and the intake manifold pressure, and a post-correction volumetric efficiency equivalent value is calculated by correcting the pre-correction volumetric efficiency equivalent value using the correction calculation parameter. The amount of air entering the cylinder 10 from the intake manifold 7 is calculated on the basis of the post-correction volumetric efficiency equivalent value. Hence, there can be achieved an advantage that an amount of cylinder suction air can be calculated with accuracy independently of a variance of the exhaust pressure even in the turbocharged internal combustion engine 100.

Also, by calculating the correction calculation parameter in accordance with Equation (8) above, there can be achieved an advantage that the correction calculation parameter can be calculated with accuracy depending on logic.

Also, by calculating the post-correction volumetric efficiency equivalent value in accordance with Equation (9) above, there can be achieved an advantage that the pre-correction volumetric efficiency equivalent value can be corrected with accuracy depending on logic.

The exhaust pressure calculation portion calculates an exhaust pressure on the basis of an exhaust gas flow rate released from the cylinder 10, atmospheric pressure, and an opening degree or an opening degree indicated value of the W/G valve 21. The exhaust gas flow rate is calculated on the basis of an amount of air entering the cylinder 10, which is in the exhaust stroke when a calculation of the exhaust gas flow rate is taking place, back in the intake stroke before the expansion stroke and the compression stroke and a target air-fuel ratio back in the intake stroke or an actual air-fuel ratio when a calculation of the exhaust gas flow rate is taking place. Hence, there can be achieved an advantage that an exhaust pressure required by the control apparatus of an internal combustion engine can be detected without having to use an expensive exhaust pressure sensor with high resistance to heat and corrosion.

While the control apparatus of an internal combustion engine according to the first embodiment of the invention has been described, it should be appreciated that the modifications and emissions may be added to the embodiment within the scope of the invention as a need arises.

Various modifications and alterations of this invention will be apparent to those skilled in the art without departing from the scope and spirit of this invention, and it should be understood that this is not limited to the illustrative embodiments set forth herein.

What is claimed is:

1. A control apparatus of an internal combustion engine controlling an internal combustion engine equipped with a supercharger having a turbine provided to an exhaust path of the internal combustion engine and a compressor provided upstream of a throttle valve provided to an intake path of the internal combustion engine and rotating integrally with the turbine, comprising:
   an intake manifold pressure detector configured to detect an internal pressure of an intake manifold formed of a portion including a surge tank and an intake manifold provided downstream of the throttle valve as an intake manifold pressure;
   an intake manifold temperature detector configured to detect an internal intake temperature of the intake manifold as an intake manifold temperature;
   a waste gate valve configured to provide to a bypass passage bypassing the turbine and changes a passage sectional area of the bypass passage by changing an opening degree;
   a rotation speed detector configured to detect a rotation speed of the internal combustion engine;
   an exhaust pressure calculator configured to calculate a pressure in the exhaust path provided upstream of the turbine as an exhaust pressure;
   a pre-correction volumetric efficiency equivalent value calculator configured to calculate a pre-correction volumetric efficiency equivalent value, which is an index indicating an amount of air entering a cylinder of the internal combustion engine from the intake manifold at one of a predetermined opening degree and a predetermined opening degree indicated value of the waste gate valve, on the basis of the intake manifold pressure and the rotation speed of the internal combustion engine; and
   an exhaust pressure calculator for pre-correction volumetric efficiency equivalent value configured to calculate an exhaust pressure for pre-correction volumetric efficiency equivalent value, which is an exhaust pressure corresponding to the pre-correction volumetric efficiency equivalent value, on the basis of the intake manifold pressure and the rotation speed of the internal combustion engine;
   a cylinder suction air amount calculator configured to calculate a correction calculation parameter using the exhaust pressure, the exhaust pressure for pre-correction volumetric efficiency equivalent value, and the intake manifold pressure, and a post-correction volumetric efficiency equivalent value is calculated by correcting the pre-correction volumetric efficiency equivalent value using the correction calculation parameter,
   wherein:
   the amount of air entering the cylinder from the intake manifold is calculated on the basis of the post-correction volumetric efficiency equivalent value; and
   fuel input into the internal combustion engine is controlled by the control apparatus at least in part based on the calculated amount of air.

2. The control apparatus of an internal combustion engine according to claim 1, wherein:
   the correction calculation parameter is calculated in accordance with an equation as follows:

$$\eta = \sqrt{\frac{\left\{\left[\left(\frac{P_b}{P_3}\right)^{\frac{1-\kappa}{\kappa}} - 1\right]\right\}}{\left\{\left[\left(\frac{P_b}{P_{30}}\right)^{\frac{1-\kappa}{\kappa}} - 1\right]\right\}}}$$

$$\text{where} \begin{cases} \frac{P_b}{P_X} = \frac{P_b}{P_X} & \text{when } \left(\frac{2}{\kappa+1}\right)^{\frac{\kappa}{\kappa-1}} < \frac{P_b}{X} \\ = \left(\frac{2}{\kappa+1}\right)^{\frac{\kappa}{\kappa-1}} & \text{when } \left(\frac{2}{\kappa+1}\right)^{\frac{\kappa}{\kappa-1}} \geq \frac{P_b}{P_X} \end{cases}$$

$\eta$ is a correction calculation parameter, $P_{30}$ is the exhaust pressure for pre-correction volumetric efficiency equivalent value, $\kappa$ is a specific heat ratio, $P_X$ is $P_3$ or $P_{30}$, $P_b$ is the intake manifold pressure, and $P_3$ is the exhaust pressure.

3. The control apparatus of an internal combustion engine according to claim 1, wherein:
   the post-correction volumetric efficiency equivalent value is calculated in accordance with an equation as follows:

$$K_{v\_new} = 1 - (1 - K_{v0}) \times \eta$$

where $K_{v\_new}$ is the post-correction volumetric efficiency equivalent value and $K_{v0}$ is the pre-correction volumetric efficiency equivalent value.

4. The control apparatus of an internal combustion engine according to claim 2, wherein:
   the post-correction volumetric efficiency equivalent value is calculated in accordance with an equation as follows:

$$K_{v\_new} = 1 - (1 - K_{v0}) \times \eta$$

where $K_{v\_new}$ is the post-correction volumetric efficiency equivalent value and $K_{v0}$ is the pre-correction volumetric efficiency equivalent value.

5. The control apparatus of an internal combustion engine according to claim 1, wherein:

the exhaust pressure calculator calculates the exhaust pressure on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

6. The control apparatus of an internal combustion engine according to claim 2, wherein:

the exhaust pressure calculator calculates the exhaust pressure on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

7. The control apparatus of an internal combustion engine according to claim 3, wherein:

the exhaust pressure calculator calculates the exhaust pressure on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

8. The control apparatus of an internal combustion engine according to claim 4, wherein:

the exhaust pressure calculator calculates the exhaust pressure on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

9. A method of controlling an internal combustion engine equipped with a supercharger having a turbine provided to an exhaust path of the internal combustion engine and a compressor provided upstream of a throttle valve provided to an intake path of the internal combustion engine and rotating integrally with the turbine, comprising:

detecting an internal pressure of an intake manifold formed of a portion including a surge tank and an intake manifold provided downstream of the throttle valve as an intake manifold pressure;

detecting an internal intake temperature of the intake manifold as an intake manifold temperature;

a waste gate valve that is provided to a bypass passage bypassing the turbine and changes a passage sectional area of the bypass passage by changing an opening degree;

detecting a rotation speed of the internal combustion engine;

calculating a pressure in the exhaust path provided upstream of the turbine as an exhaust pressure;

calculating a pre-correction volumetric efficiency equivalent value, which is an index indicating an amount of air entering a cylinder of the internal combustion engine from the intake manifold at one of a predetermined opening degree and a predetermined opening degree indicated value of a waste gate valve, on the basis of the intake manifold pressure and the rotation speed of the internal combustion engine; and calculating an exhaust pressure for pre-correction volumetric efficiency equivalent value, which is an exhaust pressure corresponding to the pre-correction volumetric efficiency equivalent value, on the basis of the intake manifold pressure and the rotation speed of the internal combustion engine, wherein:

a correction calculation parameter is calculated using the exhaust pressure, the exhaust pressure for pre-correction volumetric efficiency equivalent value, and the intake manifold pressure, and a post-correction volumetric efficiency equivalent value is calculated by correcting the pre-correction volumetric efficiency equivalent value using the correction calculation parameter;

the amount of air entering the cylinder from the intake manifold is calculated on the basis of the post-correction volumetric efficiency equivalent value; and controlling fuel input into the internal combustion engine at least in part based on the calculated amount of air.

10. A control apparatus of an internal combustion engine controlling an internal combustion engine equipped with a supercharger having a turbine provided to an exhaust path of the internal combustion engine and a compressor provided upstream of a throttle valve provided to an intake path of the internal combustion engine and rotating integrally with the turbine, comprising:

a waste gate valve that is provided to a bypass passage bypassing the turbine and changes a passage sectional area of the bypass passage by changing an opening degree;

at least one non-transitory computer readable medium operable to store program code;

at least one processor operable to read said program code and operate as instructed by the program code, the program code comprising:

detecting an internal pressure of an intake manifold formed of a portion including a surge tank and an intake manifold provided downstream of the throttle valve as an intake manifold pressure;

detecting an internal intake temperature of the intake manifold as an intake manifold temperature;

detecting a rotation speed of the internal combustion engine;

calculating a pressure in the exhaust path provided upstream of the turbine as an exhaust pressure;

calculating that calculates a pre-correction volumetric efficiency equivalent value, which is an index indicating an amount of air entering a cylinder of the internal combustion engine from the intake manifold at one of a predetermined opening degree and a predetermined opening degree indicated value of the waste gate valve, on the basis of the intake manifold pressure and the rotation speed of the internal combustion engine; and calculating an exhaust pressure for pre-correction volumetric efficiency equivalent value, which is an exhaust pressure corresponding to the pre-correction volumetric efficiency equivalent value, on the basis of the intake manifold pressure and the rotation speed of the internal combustion engine, wherein:
a correction calculation parameter is calculated using the exhaust pressure, the exhaust pressure for pre-correction volumetric efficiency equivalent value, and the intake manifold pressure, and a post-correction volumetric efficiency equivalent value is calculated by correcting the pre-correction volumetric efficiency equivalent value using the correction calculation parameter;

the amount of air entering the cylinder from the intake manifold is calculated on the basis of the post-correction volumetric efficiency equivalent value; and controlling fuel input amount to the internal combustion engine is at least in part based on the calculated amount of air.

11. A internal combustion engine equipped with a supercharger having a turbine provided to an exhaust path of the internal combustion engine and a compressor provided upstream of a throttle valve provided to an intake path of the internal combustion engine and rotating integrally with the turbine, comprising:
an intake manifold pressure detector;
an intake manifold temperature detector;
a rotation speed detector;
a waste gate valve that is provided to a bypass passage bypassing the turbine and changes a passage sectional area of the bypass passage by changing an opening degree;
a control apparatus comprising:
at least one non-transitory computer readable medium operable to store program code;
at least one processor operable to read said program code and operate as instructed by the program code, the program code comprising:
detecting an internal pressure, from the intake manifold pressure detector, of an intake manifold formed of a portion including a surge tank and an intake manifold provided downstream of the throttle valve as an intake manifold pressure;
detecting an internal intake temperature, from the intake manifold temperature detector, of the intake manifold as an intake manifold temperature;
detecting a rotation speed, from the rotation speed detector, of the internal combustion engine;
calculating a pressure in the exhaust path provided upstream of the turbine as an exhaust pressure;
calculating a pre-correction volumetric efficiency equivalent value, which is an index indicating an amount of air entering a cylinder of the internal combustion engine from the intake manifold at one of a predetermined opening degree and a predetermined opening degree indicated value of the waste gate valve, on the basis of the intake manifold pressure and the rotation speed of the internal combustion engine; and calculating an exhaust pressure for pre-correction volumetric efficiency equivalent value, which is an exhaust pressure corresponding to the pre-correction volumetric efficiency equivalent value, on the basis of the intake manifold pressure and the rotation speed of the internal combustion engine, wherein:
a correction calculation parameter is calculated using the exhaust pressure, the exhaust pressure for pre-correction volumetric efficiency equivalent value, and the intake manifold pressure, and a post-correction volumetric efficiency equivalent value is calculated by correcting the pre-correction volumetric efficiency equivalent value using the correction calculation parameter;

the amount of air entering the cylinder from the intake manifold is calculated on the basis of the post-correction volumetric efficiency equivalent value; and controlling fuel input amount to the internal combustion engine is at least in part based on the calculated amount of air.

12. The method of controlling the internal combustion engine according to claim 9, wherein:
the correction calculation parameter is calculated in accordance with an equation as follows:

$$\eta = \sqrt{\frac{\left\{\left[\left(\frac{P_b}{P_3}\right)^{\frac{1-\kappa}{\kappa}} - 1\right]\right\}}{\left\{\left[\left(\frac{P_b}{P_{30}}\right)^{\frac{1-\kappa}{\kappa}} - 1\right]\right\}}}$$

$$\text{where} \begin{cases} \frac{P_b}{P_X} = \frac{P_b}{P_X} & \text{when } \left(\frac{2}{\kappa+1}\right)^{\frac{\kappa}{\kappa-1}} < \frac{P_b}{P_X} \\ = \left(\frac{2}{\kappa+1}\right)^{\frac{\kappa}{\kappa-1}} & \text{when } \left(\frac{2}{\kappa+1}\right)^{\frac{\kappa}{\kappa-1}} \geq \frac{P_b}{P_X} \end{cases}$$

$\eta$ is a correction calculation parameter, $P_{30}$ is the exhaust pressure for pre-correction volumetric efficiency equivalent value, $\kappa$ is a specific heat ratio, $P_X$ is $P_3$ or $P_{30}$, $P_b$ is the intake manifold pressure, and $P_3$ is the exhaust pressure.

13. The method of controlling the internal combustion engine, according to claim 9, wherein:
the post-correction volumetric efficiency equivalent value is calculated in accordance with an equation as follows:

$$K_{v\_new} = 1 - (1 - K_{v0}) \times \eta$$

where $K_{v\_new}$ is the post-correction volumetric efficiency equivalent value and $K_{v0}$ is the pre-correction volumetric efficiency equivalent value.

14. The method of controlling the internal combustion engine, according to claim 12, wherein:
the post-correction volumetric efficiency equivalent value is calculated in accordance with an equation as follows:

$$K_{v\_new} = 1 - (1 - K_{v0}) \times \eta$$

where $K_{v\_new}$ is the post-correction volumetric efficiency equivalent value and $K_{v0}$ is the pre-correction volumetric efficiency equivalent value.

15. The method of controlling the internal combustion engine, according to claim 9, wherein:

the exhaust pressure is calculated on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

16. The method of controlling the internal combustion engine, according to claim 12, wherein:

the exhaust pressure is calculated on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

17. The method of controlling the internal combustion engine, according to claim 13, wherein:

the exhaust pressure is calculated on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

18. The method of controlling the internal combustion engine, according to claim 14, wherein:

the exhaust pressure is calculated on the basis of an exhaust gas flow rate released from the cylinder, atmospheric pressure, and one of an opening degree and an opening degree indicated value of the waste gate valve; and the exhaust gas flow rate is calculated on the basis of an amount of air entering the cylinder back in an intake stroke before an expansion stroke and a compression stroke from an exhaust stroke during which a calculation of the exhaust gas flow rate is taking place, and one of a target air-fuel ratio back in the intake stroke and an actual air-fuel ratio when the calculation of the exhaust gas flow rate is taking place.

* * * * *